United States Patent
Balasubramanian et al.

(10) Patent No.: US 11,856,451 B2
(45) Date of Patent: Dec. 26, 2023

(54) AVOIDING PACKET DATA CONVERGENCE PROTOCOL HOLES FOR BEARER IN DUAL CONNECTIVITY MODE ACROSS MULTIPLE RADIO ACCESS TECHNOLOGIES

(71) Applicant: QUALCOMM Incorporated, San Diego, CA (US)

(72) Inventors: Arun Prasanth Balasubramanian, San Diego, CA (US); Shailesh Maheshwari, San Diego, CA (US); Xiaojian Long, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/184,782

(22) Filed: Feb. 25, 2021

(65) Prior Publication Data
US 2021/0274380 A1   Sep. 2, 2021

Related U.S. Application Data

(60) Provisional application No. 62/984,148, filed on Mar. 2, 2020.

(51) Int. Cl.
*H04W 28/04*   (2009.01)
*H04L 1/00*   (2006.01)
(Continued)

(52) U.S. Cl.
CPC .......... *H04W 28/04* (2013.01); *H04L 1/0061* (2013.01); *H04L 1/1816* (2013.01); *H04W 28/0278* (2013.01); *H04W 76/15* (2018.02)

(58) Field of Classification Search
None
See application file for complete search history.

(56) References Cited

U.S. PATENT DOCUMENTS

2008/0045272 A1   2/2008   Wang et al.
2009/0073872 A1   3/2009   Hans et al.
(Continued)

FOREIGN PATENT DOCUMENTS

EP   3435576 A1   1/2019
KR   20080099779 A   11/2008
(Continued)

OTHER PUBLICATIONS

International Search Report and Written Opinion—PCT/US2021/019938—ISA/EPO—dated Jun. 14, 2021.

*Primary Examiner* — Marcus Smith
(74) *Attorney, Agent, or Firm* — Holland & Hart LLP

(57) ABSTRACT

Methods, systems, and devices for wireless communications are described. The method includes receiving control signaling that configures the UE with a retransmission request time duration for requesting packet retransmission relative to when a packet in a sequence of packets is determined to be unsuccessfully received, monitoring for one or more transmissions including at least a subset of packets in the sequence of packets, and transmitting, prior to expiration of the retransmission request time duration, a first retransmission request to request retransmission of at least one packet in the sequence of packets based on a first retransmission trigger being satisfied.

28 Claims, 11 Drawing Sheets

(51) Int. Cl.
   *H04L 1/1812*   (2023.01)
   *H04W 28/02*   (2009.01)
   *H04W 76/15*   (2018.01)

(56) References Cited

U.S. PATENT DOCUMENTS

| | | |
|---|---|---|
| 2010/0105334 A1 | 4/2010 | Terry et al. |
| 2012/0099525 A1 | 4/2012 | Maheshwari |
| 2013/0034014 A1 | 2/2013 | Jonsson et al. |
| 2013/0039208 A1 | 2/2013 | Jonsson et al. |
| 2016/0315736 A1* | 10/2016 | Dwarakanath ........ H04L 1/1848 |
| 2017/0078890 A1 | 3/2017 | Zhu et al. |
| 2017/0094568 A1 | 3/2017 | Yang et al. |
| 2018/0241509 A1* | 8/2018 | Phuyal .................. H04L 1/1614 |
| 2018/0332501 A1* | 11/2018 | Tseng ........................ H04L 1/08 |
| 2019/0230681 A1 | 7/2019 | Han et al. |
| 2021/0007008 A1* | 1/2021 | Gage ..................... H04L 1/1896 |
| 2021/0105663 A1* | 4/2021 | Kim .................. H04W 28/0278 |
| 2021/0359794 A1 | 11/2021 | Yang et al. |
| 2022/0085939 A1* | 3/2022 | Mondal ............... H04W 72/042 |
| 2022/0116819 A1* | 4/2022 | Deng .................... H04L 1/1621 |
| 2022/0174646 A1 | 6/2022 | Lee et al. |

FOREIGN PATENT DOCUMENTS

| | | |
|---|---|---|
| WO | 2019006945 A1 | 1/2019 |
| WO | 2019080814 A1 | 5/2019 |
| WO | 2021178241 | 9/2021 |

\* cited by examiner

AVOIDING PACKET DATA CONVERGENCE PROTOCOL HOLES FOR BEARER IN DUAL CONNECTIVITY MODE ACROSS MULTIPLE RADIO ACCESS TECHNOLOGIES

CROSS REFERENCE

The present Application for Patent claims the benefit of U.S. Provisional Patent Application No. 62/984,148 by BALASUBRAIVIANIAN et al., entitled "AVOIDING PACKET DATA CONVERGENCE PROTOCOL HOLES FOR BEARER IN DUAL CONNECTIVITY MODE ACROSS MULTIPLE RADIO ACCESS TECHNOLOGIES," filed Mar. 2, 2020, assigned to the assignee hereof, and expressly incorporated by reference herein.

FIELD OF TECHNOLOGY

The following relates generally to wireless communications and more specifically to avoiding packet data convergence protocol holes for bearer in dual connectivity mode across multiple radio access technologies.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may not receive all of the packets from a sequence of packets. In some examples, a UE may have an allotted time to request a retransmission of missing packets. However, the UE may not receive each packet that is requested within the allotted time, which may cause delays, errors, etc., resulting in a poor user experience.

SUMMARY

The described techniques relate to improved methods, systems, devices, and apparatuses that support avoiding packet data convergence protocol holes for bearers. Generally, the described techniques address downlink data throughput issues caused by packet data holes in downlink data received by user equipment. The techniques may include a UE receiving control signaling from one or more base stations. In some examples, the UE may operate in a dual connectivity mode across multiple radio access technologies. The control signaling may include configuration information that configures the UE with a retransmission request time duration. The UE may use the retransmission request time duration for requesting packet retransmission when the UE determines a packet from a sequence of packets has not been successfully received (e.g., the packet is not received or the packet is partially received). The techniques may include the UE monitoring for one or more transmissions from the one or more base stations. In some examples, the transmission may include at least a subset of packets in the sequence of packets. The techniques may include the UE transmitting a first retransmission request to the one or more base stations prior to expiration of the retransmission request time duration. In some examples, the first retransmission request may include a request retransmission of at least one packet missing in the sequence of packets. In some examples, the UE may transmit the first retransmission request based on the UE determining a first retransmission trigger is satisfied.

A method of wireless communications at a UE is described. The method may include receiving control signaling that configures the UE with a retransmission request time duration for requesting packet retransmission relative to when a packet in a sequence of packets is determined to be unsuccessfully received, monitoring for one or more transmissions including at least a subset of packets in the sequence of packets, and transmitting, prior to expiration of the retransmission request time duration, a first retransmission request to request retransmission of at least one packet in the sequence of packets based on a first retransmission trigger being satisfied.

An apparatus for wireless communications at a UE is described. The apparatus may include a processor, memory coupled with the processor, and instructions stored in the memory. The instructions may be executable by the processor to cause the apparatus to receive control signaling that configures the UE with a retransmission request time duration for requesting packet retransmission relative to when a packet in a sequence of packets is determined to be unsuccessfully received, monitor for one or more transmissions including at least a subset of packets in the sequence of packets, and transmit, prior to expiration of the retransmission request time duration, a first retransmission request to request retransmission of at least one packet in the sequence of packets based on a first retransmission trigger being satisfied.

Another apparatus for wireless communications at a UE is described. The apparatus may include means for receiving control signaling that configures the UE with a retransmission request time duration for requesting packet retransmission relative to when a packet in a sequence of packets is determined to be unsuccessfully received, monitoring for one or more transmissions including at least a subset of packets in the sequence of packets, and transmitting, prior to expiration of the retransmission request time duration, a first retransmission request to request retransmission of at least one packet in the sequence of packets based on a first retransmission trigger being satisfied.

A non-transitory computer-readable medium storing code for wireless communications at a UE is described. The code may include instructions executable by a processor to receive control signaling that configures the UE with a retransmission request time duration for requesting packet retransmission relative to when a packet in a sequence of packets is determined to be unsuccessfully received, monitor for one or more transmissions including at least a subset of packets in the sequence of packets, and transmit, prior to expiration of the retransmission request time duration, a first retransmission request to request retransmission of at least one packet in the sequence of packets based on a first retransmission trigger being satisfied.

In some examples of the method, apparatuses, and non-transitory computer-readable medium described herein, transmitting the first retransmission request may include operations, features, means, or instructions for transmitting the first retransmission request based on the first retransmission trigger that corresponds to a first elapsed amount or first elapsed percentage of the retransmission request time duration, or a first remaining amount or first remaining percentage of the retransmission request time duration.

Some examples of the method, apparatuses, and non-transitory computer-readable medium described herein may further include operations, features, means, or instructions for transmitting, prior to expiration of the retransmission request time duration and after the first retransmission request, a second retransmission request based on a second retransmission trigger being satisfied.

In some examples of the method, apparatuses, and non-transitory computer-readable medium described herein, transmitting the second retransmission request may include operations, features, means, or instructions for transmitting the second retransmission request based on the second retransmission trigger that corresponds to a second elapsed amount or second elapsed percentage of the retransmission request time duration, or a second remaining amount or second remaining percentage of the retransmission request time duration, where the second remaining amount or the second remaining percentage may be less than a first remaining amount or a first remaining percentage corresponding to the first retransmission trigger.

Some examples of the method, apparatuses, and non-transitory computer-readable medium described herein may further include operations, features, means, or instructions for establishing a first connection with a first base station via a first radio access technology and establishing a second connection with a second base station via a second radio access technology, where a first transmission of the one or more transmissions may be received from the first base station and a second transmission of the one or more transmissions may be received from the second base station.

Some examples of the method, apparatuses, and non-transitory computer-readable medium described herein may further include operations, features, means, or instructions for transmitting the first retransmission request to the first base station based on the first transmission including the at least one packet.

Some examples of the method, apparatuses, and non-transitory computer-readable medium described herein may further include operations, features, means, or instructions for transmitting the first retransmission request to the second base station based on the second transmission including the at least one packet.

Some examples of the method, apparatuses, and non-transitory computer-readable medium described herein may further include operations, features, means, or instructions for transmitting the first retransmission request to the first base station based on the first transmission including the at least one packet, and transmitting a second retransmission request to the second base station based on the second transmission from the second base station including a second packet of the at least one packet.

In some examples of the method, apparatuses, and non-transitory computer-readable medium described herein, receiving the control signaling that configures the UE with the retransmission request time duration may include operations, features, means, or instructions for receiving the control signaling that configures the UE with a retransmission request prohibition time duration, where the first retransmission request may be transmitted prior to expiration of the retransmission request prohibition time duration.

In some examples of the method, apparatuses, and non-transitory computer-readable medium described herein, receiving the control signaling that configures the UE with the retransmission request time duration may include operations, features, means, or instructions for receiving the control signaling that configures the UE with the retransmission request prohibition time duration that prohibits transmission of a next retransmission request relative to when a prior retransmission request may be transmitted.

In some examples of the method, apparatuses, and non-transitory computer-readable medium described herein, receiving the control signaling that configures the UE with the retransmission request time duration may include operations, features, means, or instructions for receiving first control signaling from the first base station that configures the UE with a first retransmission request time duration, and receiving second control signaling from the second base station that configures the UE with a second retransmission request time duration different from the first retransmission request time duration.

In some examples of the method, apparatuses, and non-transitory computer-readable medium described herein, transmitting the first retransmission request may include operations, features, means, or instructions for transmitting the first retransmission request based on the first retransmission trigger that may be an amount of remaining available memory of a buffer satisfying a first memory threshold.

Some examples of the method, apparatuses, and non-transitory computer-readable medium described herein may further include operations, features, means, or instructions for switching from a first feedback mode to a second feedback mode based on the first retransmission trigger that may be a remaining time of the retransmission request time duration satisfying a first remaining time threshold, or may be an amount of remaining available memory of a buffer satisfying a first memory threshold.

Some examples of the method, apparatuses, and non-transitory computer-readable medium described herein may further include operations, features, means, or instructions for switching back to the first feedback mode based on the amount of remaining available memory of the buffer not satisfying the first memory threshold.

In some examples of the method, apparatuses, and non-transitory computer-readable medium described herein, the second feedback mode configures the UE to transmit a retransmission request at a higher rate than in the first feedback mode.

Some examples of the method, apparatuses, and non-transitory computer-readable medium described herein may further include operations, features, means, or instructions for transmitting, prior to expiration of the retransmission request time duration and after the first retransmission request, a second retransmission request based on a second retransmission trigger being satisfied, where the second retransmission trigger may be triggered based on an amount of remaining available memory of a buffer satisfying a second memory threshold that may be less than a first memory threshold associated the first retransmission trigger.

Some examples of the method, apparatuses, and non-transitory computer-readable medium described herein may further include operations, features, means, or instructions for switching back to the second feedback mode from a third feedback mode based on the amount of remaining available memory of the buffer not satisfying the second memory threshold.

In some examples of the method, apparatuses, and non-transitory computer-readable medium described herein, the first retransmission request includes a status protocol data unit that indicates the at least one packet.

In some examples of the method, apparatuses, and non-transitory computer-readable medium described herein, the first retransmission request indicates a radio link control sequence number of a packet of the at least one packet.

DETAILED DESCRIPTION

Figure 1:
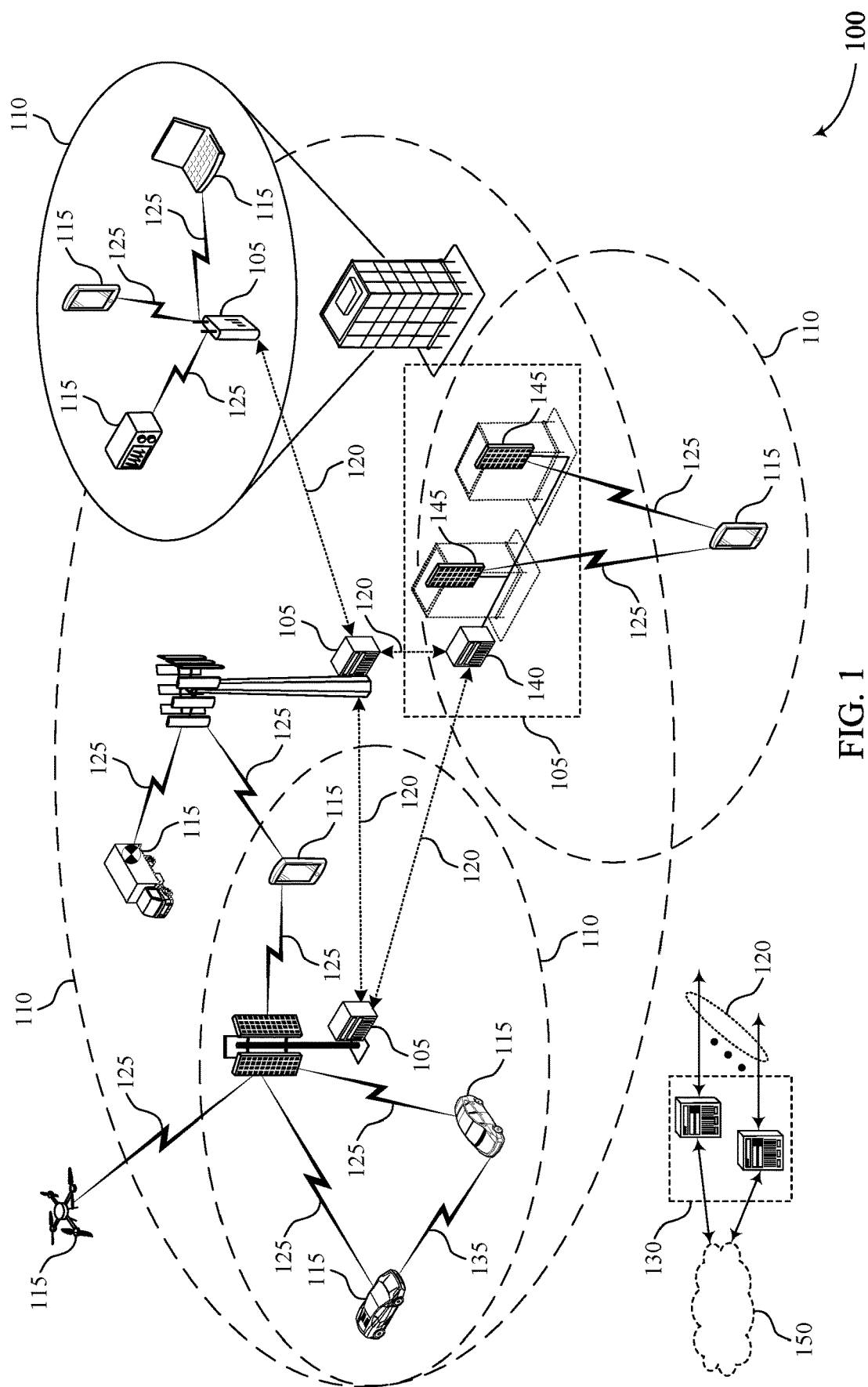
FIG. 1 illustrates an example of a system for wireless communications in accordance with aspects of the present disclosure.

In dual connectivity, a packet data convergence protocol (PDCP) receiving entity (e.g., new radio (NR) PDCP receiving entity, a user equipment, etc.) may be served by two downlink (DL) radio link control (RLC) transmitting entities (e.g., two base stations using one or more radio access technologies). In some examples, dual connectivity may include evolved universal terrestrial radio access network (E-UTRAN) new radio dual connectivity (ENDC), or evolved universal mobile telecommunications service terrestrial radio access network dual connectivity (NEDC), or new radio dual connectivity (NRDC), or any combination thereof.

In some examples, a PDCP receiving entity, such as a user equipment (UE), may be configured with one or more PDCP timers (e.g., a common t-reordering timer). The network (e.g., a base station) may configure a UE with a t-reordering timer (e.g., in millisecond units), a t-reassembly timer (e.g., in millisecond units), a t-prohibit timer (e.g., in millisecond units), or any combination thereof. In some examples, the t-reordering timer may be used by a receiving side of an RLC entity to detect loss of RLC PDUs at lower layer. In some cases, an RLC entity may be associated with one or more RLC timers (e.g., t-statusProhibit timer, t-reassembly timer in NR communications of the RLC entity, t-reordering timer in LTE communications of the RLC entity, etc.). In some examples, the t-reassembly timer may be used by the receiving side of an RLC entity to detect loss of RLC PDUs at the lower layers. In some examples, the t-prohibit timer may be used by the receiving side of an RLC entity in order to prohibit transmission of a status packet data unit. In some examples, at least one of the one or more timers may specify a duration the PDCP receiving entity waits for missing packets (e.g., partially received packets, missing or partially received protocol data units (PDUs), etc.). In some examples, when at least one of the one or more timers expires or has elapsed, the PDCP receiving entity may disregard the missing PDUs and deliver the received packets (e.g., packets received before or after a missing packet) to an upper layer of the PDCP receiving entity (e.g., radio link layer, media access control layer, physical layer, etc.). In some examples, a missing packet may result in duplicate acknowledgement (DUP ACKs), such as transfer control protocol (TCP) DUP ACKs, etc. In some examples, the DUP ACKs may cause a scaling down of a TCP window that may reduce the DL data throughput, which may result in a negative user experience.

In some examples, when one or more RLC entities do not recover the packet data holes before the PDCP timer expires, packet loss at the application layer may occur. In some systems, the RLC receiving entity may wait until a t-reassembly timer associated with NR communications expires or a t-reordering timer associated with LTE communications expires, and wait until a prohibit timer (e.g., t-status prohibit timer of an RLC entity) is not running, before generating a new status PDU (e.g., a status PDU or retransmission request that includes the sequence number (SN) of each missing packet). However, compared to these other systems the techniques described herein enable an RLC receiving entity to recover missing packets relatively quicker. The described techniques decrease the likelihood of dropped packets by removing the constraint for the RLC receiving entity to wait for RLC timers to expire and wait until the prohibit timer is not running before transmitting a status PDU with the SNs of the missing packets. Thus, the techniques described herein reduce the likelihood of packet loss at the application layer, and thus reduce the likelihood of a bad user experience as a result of missing or dropped packets. It is noted that "missing packet" may refer to a packet not transmitted by a RLC transmitting entity, or a packet not received by the PDCP receiving entity, or a packet partially received by the PDCP receiving entity, or a corrupted packet at least partially received by the PDCP receiving entity, or any combination thereof.

In some examples, the PDCP receiving entity may request that at least one of the RLC entities perform a second level negative acknowledgement (NACK) feedback mode (e.g., a fast NACK mode) based on the PDCP receiving entity determining one or more second level triggers are satisfied, where a first level NACK feedback mode may be a default NACK feedback mode (e.g., a default NACK feedback mode where NACKs or status PDUs, or both, are transmitted in accordance with RLC timers configured by the network). In some examples, the one or more second level triggers for determining whether to initiate a second level NACK feedback mode or to end the second level NACK feedback mode may include, but are not limited to, an amount of PDUs buffered in a PDCP reordering window. Examples of the one or more second level triggers may include a percentage of the window buffered (e.g., 80% buffered), or percentage unbuffered (e.g., 20% unbuffered), or amount in megabytes (MBs) of the window buffered (e.g., 8 MBs buffered of a 16 MB window), or an amount of memory remaining in the PDCP reordering window (e.g., 8 MBs remaining), or an amount a PDCP timer has elapsed (e.g., 15 milliseconds (ms) elapsed), or a percentage the PDCP timer has elapsed (e.g., 50% elapsed), or an amount of time remaining on the PDCP timer (e.g., 15 ms remaining), or a percentage of the timer remaining (e.g., 50% of timer remaining), etc., or any combination thereof.

In some examples, when the PDCP receiving entity enters the second level NACK mode (e.g., activating the second level NACK feedback mode in at least one of the one or more RLC entities) the RLC receiving entity may generate a status PDU that indicates the missing SNs. After generating the status PDU, the RLC receiving entity may transmit the status PDU to at least one of the RLC entities. In some examples, the second level NACK feedback mode (e.g., a fast NACK mode) may override the one or more RLC timers (e.g., t-reassembly timers, t-prohibit timers, etc.) configured by the network with modified timer values (e.g., fixed smaller values, a fraction of the network-configured RLC timers, a percentage of the network-configured PDCP timers, etc.). In some examples, upon activating the second level NACK feedback mode (e.g., the fast NACK mode) in an RLC entity, the RLC receiving entity may 1) build (e.g., immediately build upon activating the second level NACK feedback mode) a status PDU indicating the missing SNs and send it to lower layers for transmission to the transmitter and 2) override the timers governing the ARQ to values smaller than the configured by the NW, which may be the NW configured values, or a fixed smaller value determined based on HARQ configuration for the RAT used to previously transmit the missing SNs. In some examples, the choice of one or more timer values may be determined by the NACK feedback mode (e.g., fast NACK levels, the severity of fast NACK level triggers, satisfying one or more second level triggers, satisfying one or more third level triggers, etc.). In some examples, the choice of the one or more timer values of the second NACK feedback mode could be a percentage of the network configured values (e.g., 50%) and further move on to even smaller fixed in another NACK feedback mode (e.g., panic fast NACK mode) when the holes in PDCP are causing a window size (e.g., in megabytes (MB)) to near an upper limit for the window size, or a timer (e.g., t-reordering) may expire shortly.

In some examples, the modified timer values may be modified based on a radio access technology associated with an RLC entity. In some examples, the PDCP receiving entity may use a first fixed smaller value for a first RLC timer associated with a first RLC entity using a first radio access technology, and may use a second fixed smaller value (e.g., a second fixed smaller value different than the first fixed smaller value) for a second RLC timer associated with a second RLC entity using a second radio access technology different than the first radio access technology.

In some examples, the PDCP receiving entity may request that at least one of the RLC entities perform a third level NACK feedback mode (e.g., a panic NACK feedback mode) based on the PDCP receiving entity determining one or more third level triggers are satisfied. In some examples, the one or more third level triggers for determining whether to initiate a third level NACK feedback mode or to end the third level NACK feedback mode may include, but are not limited to, an amount of PDUs buffered in a PDCP reordering window. Examples of the one or more third level triggers may include a percentage of the window buffered (e.g., 80% buffered), or percentage unbuffered (e.g., 20% unbuffered), or an amount of the window buffered (e.g., 12.8 MBs buffered of a 16 MB window), or an amount of memory remaining in the PDCP reordering window (e.g., 3.2 MBs remaining), or an amount a PDCP timer (e.g., common PDCP t-reordering timer) has elapsed (e.g., 24 ms elapsed), or a percentage the PDCP timer has elapsed (e.g., 80% elapsed), or an amount of time remaining on the PDCP timer (e.g., 6 ms remaining), or a percentage of the timer remaining (e.g., 20% of timer remaining), etc., or any combination thereof.

Aspects of the disclosure are initially described in the context of wireless communications systems. Aspects of the disclosure are further described in the context of wireless communications environments. Aspects of the disclosure are further described in the context of flow diagrams. Aspects of the disclosure are further illustrated by and described with reference to apparatus diagrams, system diagrams, and flowcharts that relate to avoiding packet data convergence protocol holes for bearer in dual connectivity mode across multiple radio access technologies.

FIG. 1 illustrates an example of a wireless communications system 100 that supports avoiding packet data convergence protocol holes for bearer in dual connectivity mode across multiple radio access technologies in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive control signaling from one or more base stations 105. The control signaling may include configuration information that configures the UE 115 with a retransmission request time duration. The UE 115 may use the retransmission request time duration for requesting packet retransmission when the UE 115 determines a packet from a sequence of packets has not been successfully received (e.g., the packet is not received or the packet is partially received). The techniques may include the UE 115 monitoring for one or more transmissions from the one or more base stations 105. In some examples, the transmission may include at least a subset of packets in the sequence of packets. The techniques may include the UE 115 transmitting a first retransmission request to the one or more base stations 105 prior to expiration of the retransmission request time duration. In some examples, the first retransmission request may include a request retransmission of at least one packet missing in the sequence of packets. In some examples, the UE 115 may transmit the first retransmission request based on the UE 115 determining a first retransmission trigger is satisfied.

By including or configuring the UE 115 may support techniques for reducing a time it takes to recover missing packets to avoid packet data convergence protocol holes. By avoiding packet data convergence protocol holes, the UE 115 reduces packet loss, thereby improving network efficiency and user experience.

Figure 2:
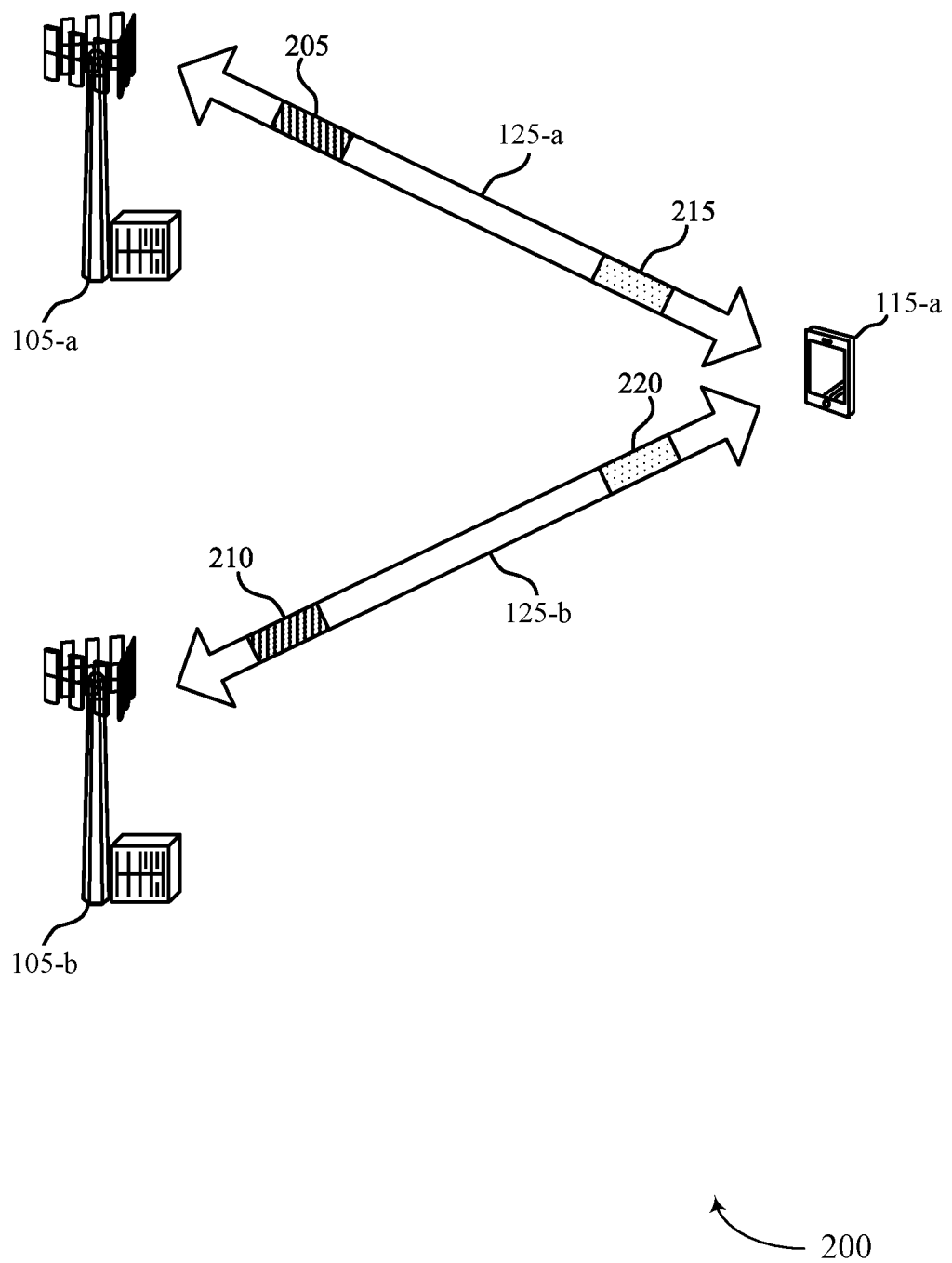
FIG. 2 illustrates an example of an environment in accordance with aspects of the present disclosure.

FIG. 2 illustrates an example of an environment 200 that supports avoiding packet data convergence protocol holes for bearer in dual connectivity mode across multiple radio access technologies in accordance with aspects of the present disclosure. In some examples, environment 200 may implement aspects of wireless communication system 100.

UE 115-a may be one example of a UE 115 from FIG. 1. In some examples, UE 115-a may be one example of a multi-SIM device. In some examples, UE 115-a may be configured to establish or request to establish communication link 125-a with base station 105-b. In some examples, UE 115-a may be configured to establish or request to establish communication link 125-b with base station 105-a. In some examples, UE 115-a may establish a first connection with base station 105-b based at least in part on a first subscription enabled by a first SIM of UE 115-a. In some examples, UE 115-a may establish a second connection (e.g., a concurrent second connection) with base station 105-a based at least in part on a second subscription enabled by a second SIM of UE 115-a.

In some examples, base station 105-a may transmit control signaling 205 to UE 115-a. In some examples, base station 105-b may transmit control signaling 210 to UE 115-a. In some examples, control signaling 205 from base station 105-a or control signaling 210 from base station 105-b may include configuration information to configure UE 115-a with a retransmission request prohibition time duration. In some examples, the retransmission request prohibition time duration may specify that UE 115-a may transmit a status protocol data unit (PDU) when retransmission request prohibition time duration has expired. In some examples, the control signaling 205 or control signaling 210 may specify that UE 115-a starts the retransmission request prohibition time duration each time UE 115-a transmits a status PDU. In some examples, UE 115-a may determine that a packet from base station 105-a is missing from a first sequence of packets. In some examples, UE 115-a may determine that a packet from base station 105-*b* is missing from a second sequence of packets. In some examples, when UE 115-*a* determines that one or more packets from base station 105-*a* are missing from the first sequence of packets, UE 115-*a* may transmit retransmission request 215 to base station 105-*a* prior to the expiration of the retransmission request prohibition time duration. In some examples, when UE 115-*a* determines that one or more packets from base station 105-*b* are missing from the second sequence of packets, UE 115-*a* may transmit retransmission request 220 to base station 105-*b* prior to the expiration of the retransmission request prohibition time duration. In some examples, transmit retransmission request 215 may include a first status PDU. In some examples, transmit retransmission request 220 may include a second status PDU.

In some examples, UE 115-*a* may be configured to operate in one or more feedback modes. In some examples, UE 115-*a* may be configured in a first feedback mode (e.g., a default feedback mode) when UE 115-*a* receives a first packet from a sequence of packets from base station 105-*a* or base station 105-*b*. In some examples, UE 115-*a* may switch to a second feedback mode (e.g., a fast NACK feedback mode) based on an amount of time left on a timer (e.g., amount of time left on a retransmission request time duration) or an amount of memory remaining in a buffer, or both. In some examples, the second feedback mode may configure UE 115-*a* to transmit a retransmission request (e.g., retransmission request 215, retransmission request 220) at a higher rate than in the first feedback mode. In some examples, when UE 115-*a* is in a first feedback mode and a retransmission request prohibition time duration is active and has not expired, UE 115-*a* may wait to transmit retransmission request 215 to base station 105-*a* until the expiration of the retransmission request prohibition time duration. In some examples, when UE 115-*a* is in a second feedback mode (e.g., a fast NACK mode) or a second feedback mode (e.g., a panic NACK mode) and a retransmission request prohibition time duration is active and has not expired, UE 115-*a* may transmit retransmission request 215 to base station 105-*a* prior to the expiration of the retransmission request prohibition time duration.

In some examples, control signaling 205 or control signaling 210 may include configuration information to configure UE 115-*a* with a retransmission request time duration. In some examples, control signaling 205 may configure UE 115-*a* with a first retransmission request time duration. In some examples, control signaling 210 may configure UE 115-*a* with a second retransmission request time duration. In some examples, the second retransmission request time duration may be the same as or may be different from the first retransmission request time duration. In some examples, base station 105-*a* may use a first radio access technology. In some examples, base station 105-*b* may use a second radio access technology that is the same as or different from the first radio access technology. In some examples, the first retransmission request time duration may be associated with the first radio access technology, and the second retransmission request time duration may be associated with the second radio access technology. Examples of the retransmission request time duration (e.g., the first retransmission request time duration indicated in control signaling 205, or the second retransmission request time duration indicated in control signaling 210, or both) may include one or more t-reordering time durations, or one or more t-reassembly time durations, or any combination thereof.

In some examples, UE 115-*a* may be configured to receive a first sequence of packets from base station 105-*a*, or UE 115-*a* may be configured to receive a second sequence of packets from base station 105-*b*, or both. In some examples, control signaling 205 or control signaling 210 may configure UE 115-*a* to start the retransmission request time duration based on UE 115-*a* receiving a sequence of packets or based on UE 115-*a* determining a packet from the sequence of packets is missing (e.g., a sequence of packets UE 115-*a* receives from base station 105-*a* or base station 105-*b*). In some examples, UE 115-*a* may determine a packet is missing when UE 115-*a* determines a sequence number of a packet is missing in a sequence of packets. In one example, UE 115-*a* may determine that packet 3 (e.g., a packet with sequence number 3) is missing when UE 115-*a* first receives packet 1, receives packet 2 after packet 1, and receives packet 4 after packet 2.

In some examples, after initiating a timer with a duration based on the retransmission request time duration, UE 115-*a* may switch from a first feedback mode to a second feedback mode (e.g., a fast NACK feedback mode) based on an amount of time remaining on the timer (e.g., 60% or more of retransmission request time duration has elapsed as one example, or 40% or less of retransmission request time duration remains as one example). In some examples, UE 115-*a* may transmit retransmission request 215 to base station 105-*a* when an amount of time remaining on a first retransmission request time duration (e.g., indicated in control signaling 205) satisfies a first time threshold (e.g., the time elapsed exceeds a first elapsed time threshold, or the time remaining is less than a first remaining time threshold). In some examples, UE 115-*a* may transmit retransmission request 220 to base station 105-*b* when an amount of time remaining on a second retransmission request time duration (e.g., indicated in control signaling 210) satisfies a second time threshold (e.g., the time elapsed exceeds a second elapsed time threshold, or the time remaining is less than a second remaining time threshold).

In some examples, UE 115-*a* may switch from the first feedback mode to the second feedback mode based on an amount of memory remaining in a buffer (e.g., 60% or more of the buffer has been allocated as one example, or 40% or less of memory in the buffer remains available as one example). In some examples, UE 115-*a* may switch from the first feedback mode to the second feedback mode based on a combination of the amount of time remaining on the timer and the amount of memory remaining in the buffer. In some examples, the buffer may store one or more packets received by UE 115-*a* (e.g., one or more packets from the sequence of packets).

In some examples, UE 115-*a* may switch from the second feedback mode to a third feedback mode (e.g., a panic NACK feedback mode) based on the amount of time remaining on the retransmission request time duration (e.g., 80% or more of retransmission request time duration has elapsed, or 20% or less of retransmission request time duration remains) or the amount of memory remaining in the buffer (e.g., 80% or more of the buffer has been allocated, or 20% or less of memory in the buffer remains available), or both. In some examples, control signaling 205 may indicate a first memory threshold for switching to the second feedback mode, or a second memory threshold for switching to the third feedback mode, or both. In some examples, the third feedback mode may configure UE 115-*a* to transmit a retransmission request (e.g., retransmission request 215, retransmission request 220) at a higher rate than in the second feedback mode or the first feedback mode.

In some examples, prior to expiration of the retransmission request time duration, UE 115-*a* may transmit a first retransmission request (e.g., retransmission request 215) to base station 105-*a* based on a first retransmission trigger being satisfied (e.g., at least 50% of a timer with a duration of the retransmission request time duration has elapsed or at least 50% of memory in a buffer has been allocated). In some examples, the UE 115-*a* may switch to the second feedback mode based on the first retransmission trigger being satisfied. In some examples, prior to expiration of the retransmission request time duration and after transmitting the first retransmission request (e.g., retransmission request 215) to base station 105-*a*, UE 115-*a* may transmit a second retransmission request to base station 105-*a* based at least in part on a second retransmission trigger of control signaling 205 being satisfied (e.g., at least 80% of a first timer with a duration of a first retransmission request time duration has elapsed or at least 80% of memory in a buffer of UE 115-*a* has been allocated). In some examples, the UE 115-*a* may switch to the third feedback mode based on the second retransmission trigger of control signaling 205 being satisfied.

In some examples, prior to expiration of the retransmission request time duration and after transmitting a first retransmission request to base station 105-*b* (e.g., retransmission request 220), UE 115-*a* may transmit a second retransmission request to base station 105-*b* based on a second retransmission trigger of control signaling 210 being satisfied (e.g., at least 80% of a second timer with a duration of a second retransmission request time duration has elapsed or at least 80% of memory in a buffer of UE 115-*a* has been allocated). In some examples, the UE 115-*a* may switch to the third feedback mode based on the second retransmission trigger of control signaling 210 being satisfied.

In some examples, UE 115-*a* may switch from the third feedback mode to the second feedback mode based on the amount of remaining available memory of the buffer not satisfying the second memory threshold. For example, when the second memory threshold is satisfied when the amount of remaining memory is 20% or less or satisfied when the amount of remaining memory is less than 20%, UE 115-*a* may switch from the third feedback mode to the second feedback mode when the amount of remaining available memory is greater than 20% of the buffer capacity or at least 20% of memory in the buffer is unallocated.

In some examples, UE 115-*a* may switch from the second feedback mode to the first feedback mode based on the amount of remaining available memory of the buffer not satisfying the first memory threshold. For example, when the first memory threshold is satisfied when the amount of remaining memory is 50% or less or satisfied when the amount of remaining memory is less than 50%, UE 115-*a* may switch from the second feedback mode to the first feedback mode when the amount of remaining available memory is greater than 50% of the buffer capacity or at least 50% of memory in the buffer is unallocated. In some examples, UE 115-*a* may switch from the third feedback mode to the second feedback mode or from the third feedback mode to the first feedback mode based on the retransmission request time duration lapsing (e.g., a timer with a duration of the retransmission request time duration lapsing).

In some examples, a first retransmission request time duration indicated in control signaling 205 includes a status protocol data unit that indicates one or more missing packets in a sequence of packets from base station 105-*a*. In some examples, a second retransmission request time duration indicated in control signaling 210 includes a status protocol data unit that indicates one or more missing packets in a sequence of packets from base station 105-*b*. In some examples, retransmission request 215 indicates a radio link control sequence number for each missing packet of the sequence of packets from base station 105-*a*. In some examples, retransmission request 220 indicates a radio link control sequence number for each missing packet of the sequence of packets from base station 105-*b*.

Figure 3:
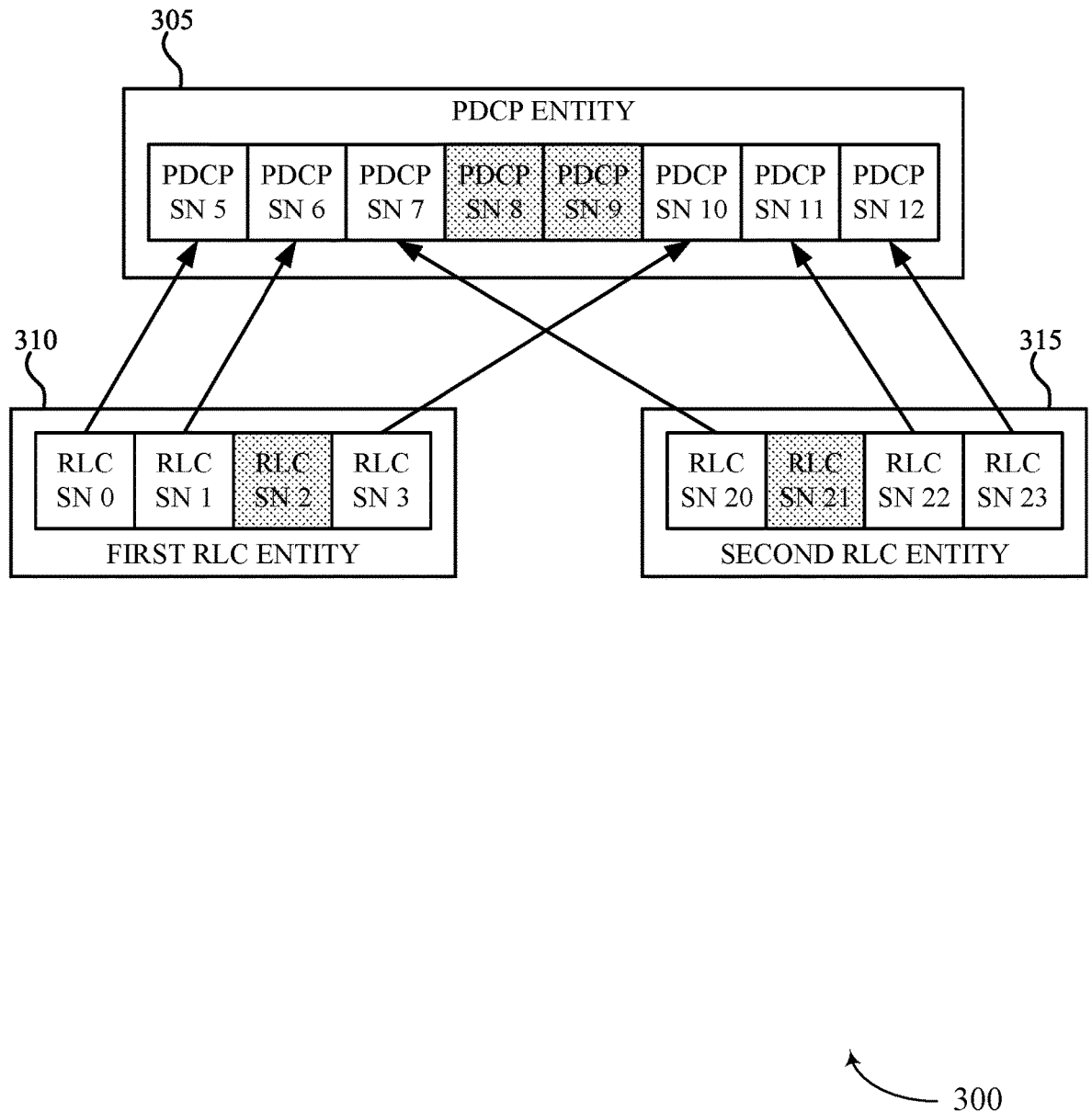
FIG. 3 illustrates an example of an environment in accordance with aspects of the present disclosure.

FIG. 3 illustrates an example of an environment 300 that supports avoiding packet data convergence protocol holes for bearer in dual connectivity mode across multiple radio access technologies in accordance with aspects of the present disclosure. In some examples, environment 300 may implement aspects of wireless communication system 100.

In the illustrated example, environment 300 may include PDCP entity 305, first RLC entity 310, and second RLC entity 315. Examples of PDCP entity 305 may include a UE 115 of FIG. 1 or 2. Examples of first RLC entity 310 or second RLC entity 315 may include a base station 105 of FIG. 1 or 2.

As shown, the PDCP entity 305 may receive one or more packets from first RLC entity 310 (e.g., PDCP SN 5, PDCP SN 6, PDCP SN 10, etc.). In some examples, PDCP entity 305 may determine that a SN of a packet received from first RLC entity 310 is received out of sequence. For example, after receiving PDCP SN 6 from first RLC entity 310, PDCP entity 305 may expect to next receive PDCP SN 8 from first RLC entity 310. However, instead PDCP entity 305 receives PDCP SN 10 next. Accordingly, PDCP entity 305 may determine that PDCP SN 6 is associated with the RLC SN 1 packet of first RLC entity 310 and that PDCP SN 10 is associated with the RLC SN 3 packet of first RLC entity 310. In some examples, PDCP entity 305 may initiate a first RLC timer associated with first RLC entity 310. In some examples, after determining one or more packets from first RLC entity 310 are missing, or partially received, or corrupted, PDCP entity 305 may monitor the first RLC timer. In some examples, after determining one or more packets from first RLC entity 310 are missing, or partially received, or corrupted, PDCP entity 305 may monitor a buffer associated with the packets received from first RLC entity 310.

In some examples, when PDCP entity 305 determines an amount of time remaining on the first RLC timer satisfies a first timer threshold, or that an amount of memory remaining in the buffer satisfies a buffer threshold, PDCP entity 305 may generate a first retransmission request and transmit the first retransmission request to first RLC entity 310. In some examples, the first retransmission request may indicate the RLC SN 2 packet is missing. In some examples, PDCP entity 305 may receive the missing RLC SN 2 packet from the first RLC entity 310 based on the first retransmission request. In some examples, when PDCP entity 305 receives missing packets from first RLC entity 310 before the first RLC timer expires, PDCP entity 305 may process each of the packets received from first RLC entity 310 and send the processed packets to an upper layer of PDCP entity 305.

As shown, PDCP entity 305 may receive one or more packets from second RLC entity 315 (e.g., PDCP SN 7, PDCP SN 11, PDCP SN 12, etc.). In some examples, PDCP entity 305 may determine that a SN of a packet received from second RLC entity 315 is received out of sequence. For example, after receiving PDCP SN 7 from second RLC entity 315, PDCP entity 305 may expect to next receive PDCP SN 9 from second RLC entity 315. However, instead PDCP entity 305 receives PDCP SN 11 next. Accordingly, PDCP entity 305 may determine that PDCP SN 7 is associated with the RLC SN 20 packet of second RLC entity 315 and that PDCP SN 11 is associated with the RLC SN 22 packet of second RLC entity 315. In some examples, PDCP entity 305 may initiate a second RLC timer associated with second RLC entity 315. In some examples, after determining one or more packets from second RLC entity 315 are missing, or partially received, or corrupted, PDCP entity 305 may monitor the second RLC timer. In some examples, after determining one or more packets from second RLC entity 315 are missing, or partially received, or corrupted, PDCP entity 305 may monitor a buffer associated with the packets received from second RLC entity 315. In some examples, when PDCP entity 305 determines an amount of time remaining on the second RLC timer satisfies a second timer threshold, or that an amount of memory remaining in the buffer satisfies a buffer threshold, PDCP entity 305 may generate a second retransmission request and transmit the second retransmission request to second RLC entity 315. In some examples, the second retransmission request may indicate the RLC SN 21 packet is missing. In some examples, PDCP entity 305 may receive the missing RLC SN 21 packet from the second RLC entity 315 based on the second retransmission request. In some examples, when PDCP entity 305 receives missing packets from second RLC entity 315 before the second RLC timer expires, PDCP entity 305 may process each of the packets received from second RLC entity 315 and send the processed packets to an upper layer of PDCP entity 305.

Figure 4:
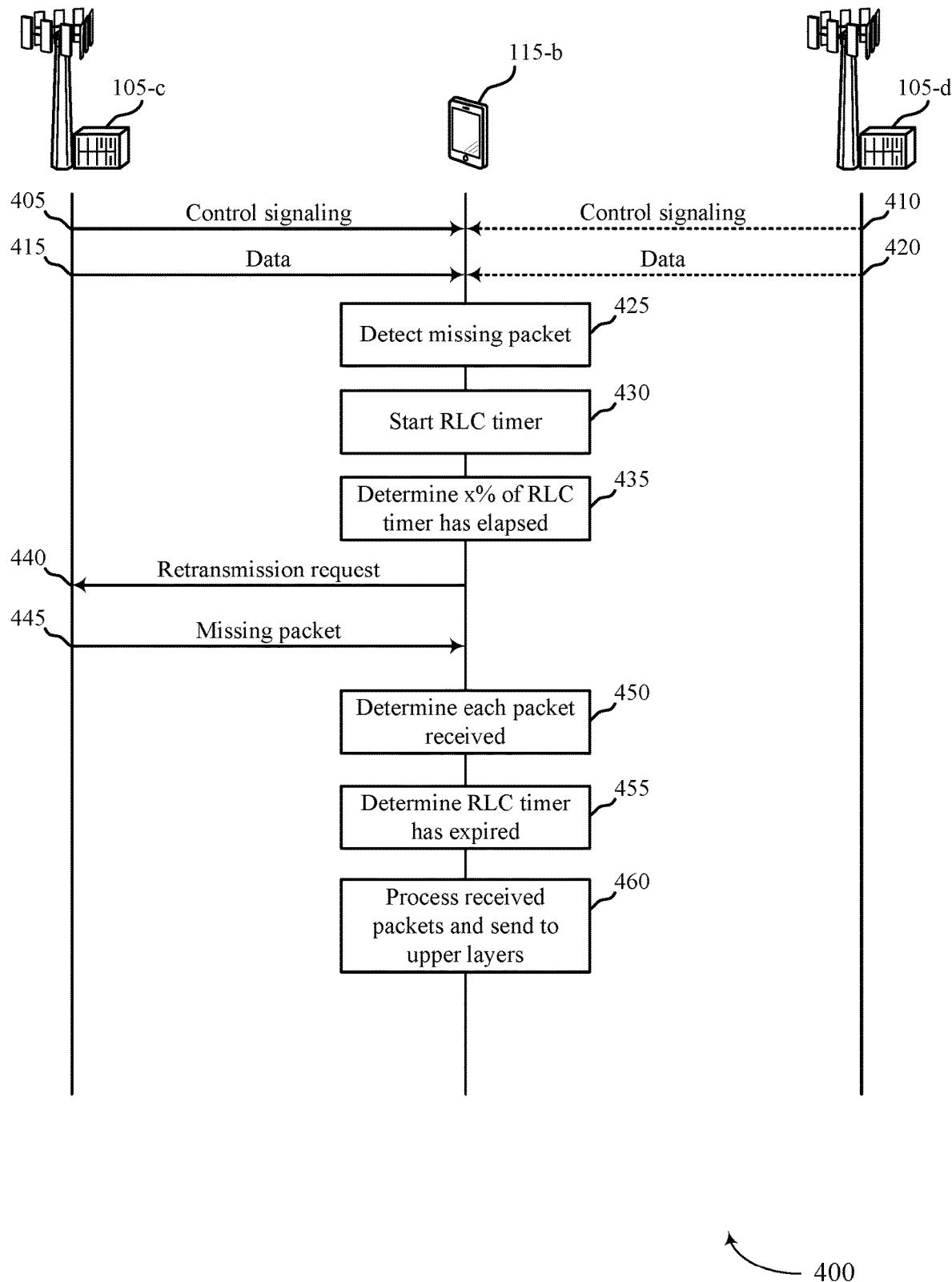
FIG. 4 illustrates an example of a flow diagram in accordance with aspects of the present disclosure.

FIG. 4 illustrates an example of an flow diagram 400 that supports avoiding packet data convergence protocol holes for bearer in dual connectivity mode across multiple radio access technologies in accordance with aspects of the present disclosure. In some examples, flow diagram 400 may implement aspects of wireless communication system 100.

In the illustrated example, flow diagram 400 may include base station 105-*c*, UE 115-*b*, and base station 105-*d*. In some examples, UE 115-*b* may be one example of a UE 115 from FIG. 1 or 2. In some examples, base station 105-*c* or base station 105-*d* may be one example of a base station 105 from FIG. 1 or 2. In some examples, UE 115-*b* may be one example of a multi-SIM device. In one example, UE 115-*b* may be a dual-SIM dual-standby (DSDS) device. In some examples, UE 115-*b* may establish a first connection with base station 105-*c* based at least in part on a first SIM of UE 115-*b*. In some examples, UE 115-*b* may establish a second connection with base station 105-*d* based at least in part on a second SIM of UE 115-*b*.

At 405, base station 105-*c* may transmit control signaling to UE 115-*b*. In some cases, the control signaling at 405 may include configuration information. In some examples, the control signaling at 405 may include a RLC timer configuration (e.g., RLC timer duration, etc.). In some examples, the RLC timer configuration may be based on a radio access technology of base station 105-*c*.

At 410, base station 105-*d* may optionally transmit control signaling to UE 115-*b*. In some cases, the control signaling at 410 may include configuration information. In some examples, the control signaling at 410 may include a RLC timer configuration (e.g., RLC timer duration, etc.). In some examples, the RLC timer configuration may be based on a radio access technology of base station 105-*d*.

At 415, base station 105-*c* may transmit data (e.g., data packets) to UE 115-*b*. In some examples, the data transmitted at 415 may include a sequence of data packets.

At 420, base station 105-*d* may optionally transmit data (e.g., data packets) to UE 115-*b*. In some examples, the data transmitted at 420 may include a sequence of data packets.

At 425, UE 115-*b* may determine that one or more packets from the data transmitted at 415 are missing, partially received, or corrupted. In some examples, UE 115-*b* may determine a packet is missing based on receiving a packet out of sequence or determining a packet of an expected sequence number has not yet been received.

At 430, UE 115-*b* may initiate at least one RLC timer. In some examples, a duration of a first RLC timer at 430 may be based on control signaling received at 405. In some examples, a duration of a second RLC timer at 430 may be based on control signaling received at 410.

At 435, UE 115-*b* may determine x % of the RLC timer has elapsed (e.g., 50% of the first RLC timer has elapsed or 50% of the second RLC timer has elapsed, or 50% of both timers has elapsed).

At 440, UE 115-*b* may generate a retransmission request (e.g., status PDU) and transmit the retransmission request to base station 105-*c*. In some examples, UE 115-*b* may generate the retransmission request based on UE 115-*b* determining x % of the RLC timer has elapsed. In some examples, the retransmission request may include a sequence number (e.g., RLC sequence number) of the missing packet.

At 445, base station 105-*c* may transmit (e.g., retransmit) the missing packet to UE 115-*b*. In some examples, base station 105-*c* may retransmit the missing packet based on the sequence number included in the retransmission request.

At 450, UE 115-*b* may determine each packet associated with the data at 415 is received. In some examples, UE 115-*b* may determine each sequence number of the sequence of packets associated with the data at 415 is accounted for.

At 455, UE 115-*b* may determine that the RLC timer initiated at 430 has expired.

At 460, UE 115-*b* may process each of the received packets (e.g., strip RLC headers, etc.) and send the processed packets to an upper layer of UE 115-*b* (e.g., RLC layer of UE 115-*b*, etc.).

Figure 5:
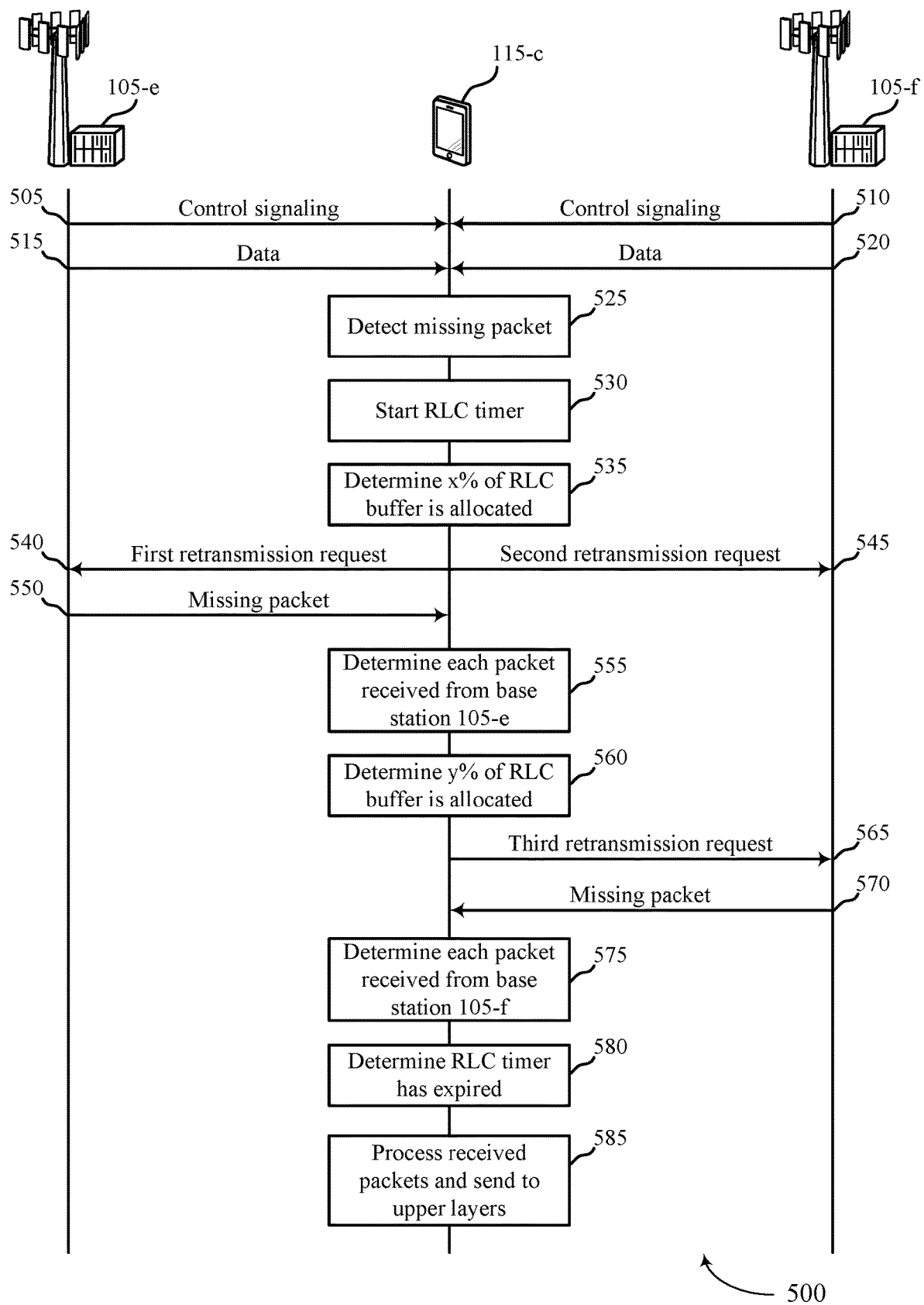
FIG. 5 illustrates an example of a flow diagram in accordance with aspects of the present disclosure.

FIG. 5 illustrates an example of an flow diagram 500 that supports avoiding packet data convergence protocol holes for bearer in dual connectivity mode across multiple radio access technologies in accordance with aspects of the present disclosure. In some examples, flow diagram 500 may implement aspects of wireless communication system 100.

In the illustrated example, flow diagram 500 may include base station 105-*e*, UE 115-*c*, and base station 105-*f*. In some examples, UE 115-*c* may be one example of a UE 115 from FIG. 1 or 2. In some examples, base station 105-*e* or base station 105-*f* may be one example of a base station 105 from FIG. 1 or 2. In some examples, UE 115-*c* may be one example of a multi-SIM device. In one example, UE 115-*c* may be a dual-SIM dual-standby (DSDS) device. In some examples, UE 115-*c* may establish a first connection with base station 105-*e* based at least in part on a first SIM of UE 115-*c*. In some examples, UE 115-*c* may establish a second connection with base station 105-*f* based at least in part on a second SIM of UE 115-*c*.

At 505, base station 105-*e* may transmit control signaling to UE 115-*c*. In some cases, the control signaling at 505 may include configuration information. In some examples, the control signaling at 505 may include a first RLC timer configuration (e.g., first RLC timer duration, etc.). In some examples, the first RLC timer configuration may be based on a radio access technology of base station 105-*e*.

At 510, base station 105-*f* may transmit control signaling to UE 115-*c*. In some cases, the control signaling at 510 may include configuration information. In some examples, the control signaling at 510 may include a second RLC timer configuration (e.g., second RLC timer duration, etc.). In some examples, the second RLC timer configuration may be based on a radio access technology of base station 105-*f*.

At 515, base station 105-*e* may transmit data (e.g., data packets) to UE 115-*c*. In some examples, the data transmitted at 515 may include a first sequence of data packets.

At 520, base station 105-*f* may transmit data (e.g., data packets) to UE 115-*c*. In some examples, the data transmitted at 520 may include a second sequence of data packets.

At 525, UE 115-*c* may determine that one or more packets from the data transmitted at 515 are missing, partially received, or corrupted. At 525, UE 115-*c* may also determine that one or more packets from the data transmitted at 520 are missing, partially received, or corrupted. In some examples, UE 115-*c* may determine a packet is missing based on receiving a packet out of sequence or determining a packet of an expected sequence number has not yet been received.

At 530, UE 115-*c* may initiate a first RLC timer and initiate a second RLC timer. In some examples, a duration of the first RLC timer at 530 may be based on control signaling received at 505 (e.g., the first RLC timer of the first RLC timer duration). In some examples, a duration of the second RLC timer at 530 may be based on control signaling received at 510 (e.g., the second RLC timer of the second RLC timer duration).

At 535, UE 115-*c* may determine x % of a RLC buffer has been allocated (e.g., 50% of the RLC buffer has been allocated). In some examples, UE 115-*c* may determine that x % of the first RLC timer or x % of the second RLC timer has elapsed (e.g., 50% of the first RLC timer has elapsed or 50% of the second RLC timer has elapsed, or 50% of both timers has elapsed). In some cases, UE 115-*c* may determine x % of a PDCP buffer has been allocated (e.g., 50% of the PDCP buffer has been allocated).

At 540, UE 115-*c* may generate a first retransmission request (e.g., first status PDU) and transmit the first retransmission request to base station 105-*e*. In some examples, UE 115-*c* may generate the first retransmission request based on UE 115-*c* determining at least x % of the buffer is allocated (e.g., at least 50% of the buffer is allocated). In some examples, UE 115-*c* may generate the first retransmission request based on UE 115-*c* determining x % of the first RLC timer has elapsed. In some examples, the first retransmission request may include a sequence number (e.g., RLC sequence number) of the missing packet associated with data at 515.

At 545, UE 115-*c* may generate a second retransmission request (e.g., second status PDU) and transmit the second retransmission request to base station 105-*f* In some examples, UE 115-*c* may generate the second retransmission request based on UE 115-*c* determining at least x % of the buffer is allocated (e.g., at least 50% of the buffer is allocated). In some examples, UE 115-*c* may generate the second retransmission request based on UE 115-*c* determining x % of the second RLC timer has elapsed. In some examples, the second retransmission request may include a sequence number (e.g., RLC sequence number) of the missing packet associated with data at 520.

At 550, base station 105-*e* may transmit (e.g., retransmit) the missing packet to UE 115-*c*. In some examples, base station 105-*e* may retransmit the missing packet based on the sequence number included in the first retransmission request.

At 555, UE 115-*c* may determine each packet associated with data at 515 is received. In some examples, UE 115-*c* may determine each sequence number of the sequence of packets associated with the data at 515 is accounted for.

At 560, UE 115-*c* may determine y % of a RLC buffer has been allocated (e.g., 80% of the RLC buffer has been allocated), where y is greater than x. In some examples, UE 115-*c* may determine that y % of the first RLC timer or y % of the second RLC timer has elapsed (e.g., 80% of the first RLC timer has elapsed or 80% of the second RLC timer has elapsed, or 80% of both timers has elapsed). In some cases, UE 115-*c* may determine y % of a PDCP buffer has been allocated (e.g., 80% of the PDCP buffer has been allocated), where y is greater than x.

At 565, UE 115-*c* may generate a third retransmission request (e.g., third status PDU) and transmit the third retransmission request to base station 105-*f*. In some examples, UE 115-*c* may generate the third retransmission request based on UE 115-*c* determining at least y % of the buffer is allocated (e.g., at least 80% of the buffer is allocated). In some examples, UE 115-*c* may generate the third retransmission request based on UE 115-*c* determining y % of the second RLC timer has elapsed. In some examples, the third retransmission request may include a sequence number (e.g., RLC sequence number) of the missing packet associated with data at 520.

In some examples, UE 115-*c* may determine that at least two packets associated with the data at 520 are missing. In some examples, UE 115-*c* may receive a first of the two missing packets in response to the second retransmission request at 545. However, after determining y % of the RLC buffer is allocated or y % of the second RLC timer has elapsed, or both, UE 115-*c* may determine the second of the two missing packets is still missing. Accordingly, UE 115-*c* may generate the third retransmission request to request the second of the two missing packets.

At 570, base station 105-*f* may transmit (e.g., retransmit) at least one remaining missing packet to UE 115-*c*. In some examples, base station 105-*f* may retransmit the missing packet based on the sequence number included in the third retransmission request.

At 575, UE 115-*c* may determine each packet associated with the data at 520 is received. In some examples, UE 115-*c* may determine each sequence number of the sequence of packets associated with the data at 520 is accounted for.

At 580, UE 115-*c* may determine that the first RLC timer initiated at 530 or the second RLC timer initiated at 530 has expired, or that both have expired.

At 585, UE 115-*c* may process each of the received packets associated with the data at 515 and process each of the received packets associated with the data at 520, and then send the processed packets to an upper layer of UE 115-*c* (e.g., RLC layer of UE 115-*c*, etc.).

Figure 6:
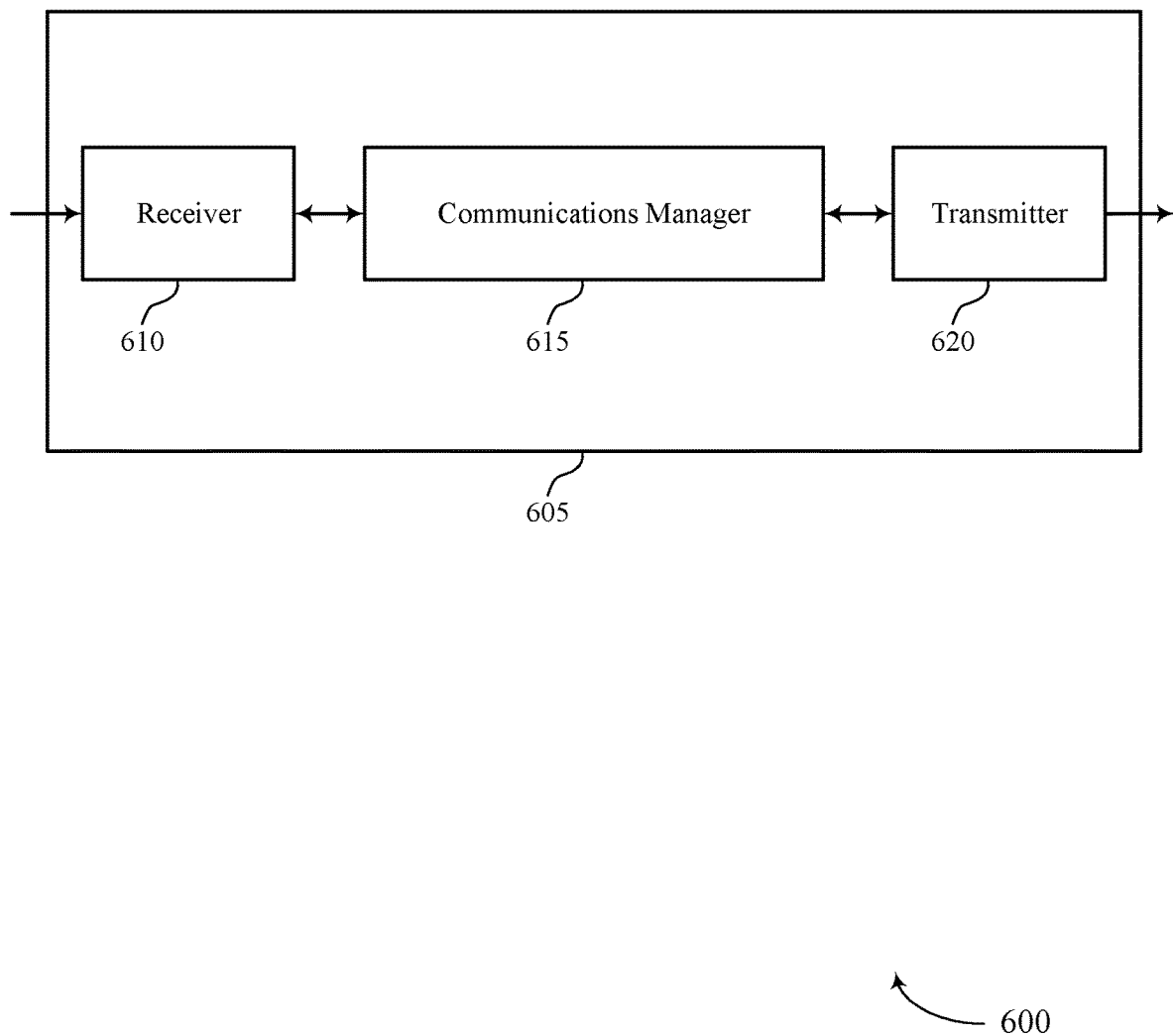
FIGS. 6 and 7 show block diagrams of devices in accordance with aspects of the present disclosure.

FIG. 6 shows a block diagram 600 of a device 605 that supports avoiding packet data convergence protocol holes for bearer in dual connectivity mode across multiple radio access technologies in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to avoiding packet data convergence protocol holes for bearer in dual connectivity mode across multiple radio access technologies, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive control signaling that configures the UE with a retransmission request time duration for requesting packet retransmission relative to when a packet in a sequence of packets is determined to be unsuccessfully received, monitor for one or more transmissions including at least a subset of packets in the sequence of packets, and transmit, prior to expiration of the retransmission request time duration, a first retransmission request to request retransmission of at least one packet in the sequence of packets based on a first retransmission trigger being satisfied. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

By including or configuring the communications manager 615 in accordance with examples as described herein, the device 605 (e.g., a processor controlling or otherwise coupled to the receiver 610, the transmitter 620, the communications manager 615, or a combination thereof) may support techniques for reducing a time it takes to recover missing packets to avoid packet data convergence protocol holes. By avoiding packet data convergence protocol holes, the device 605 reduces processing, reduces power consumption, and provides more efficient utilization of communication resources.

Figure 7:
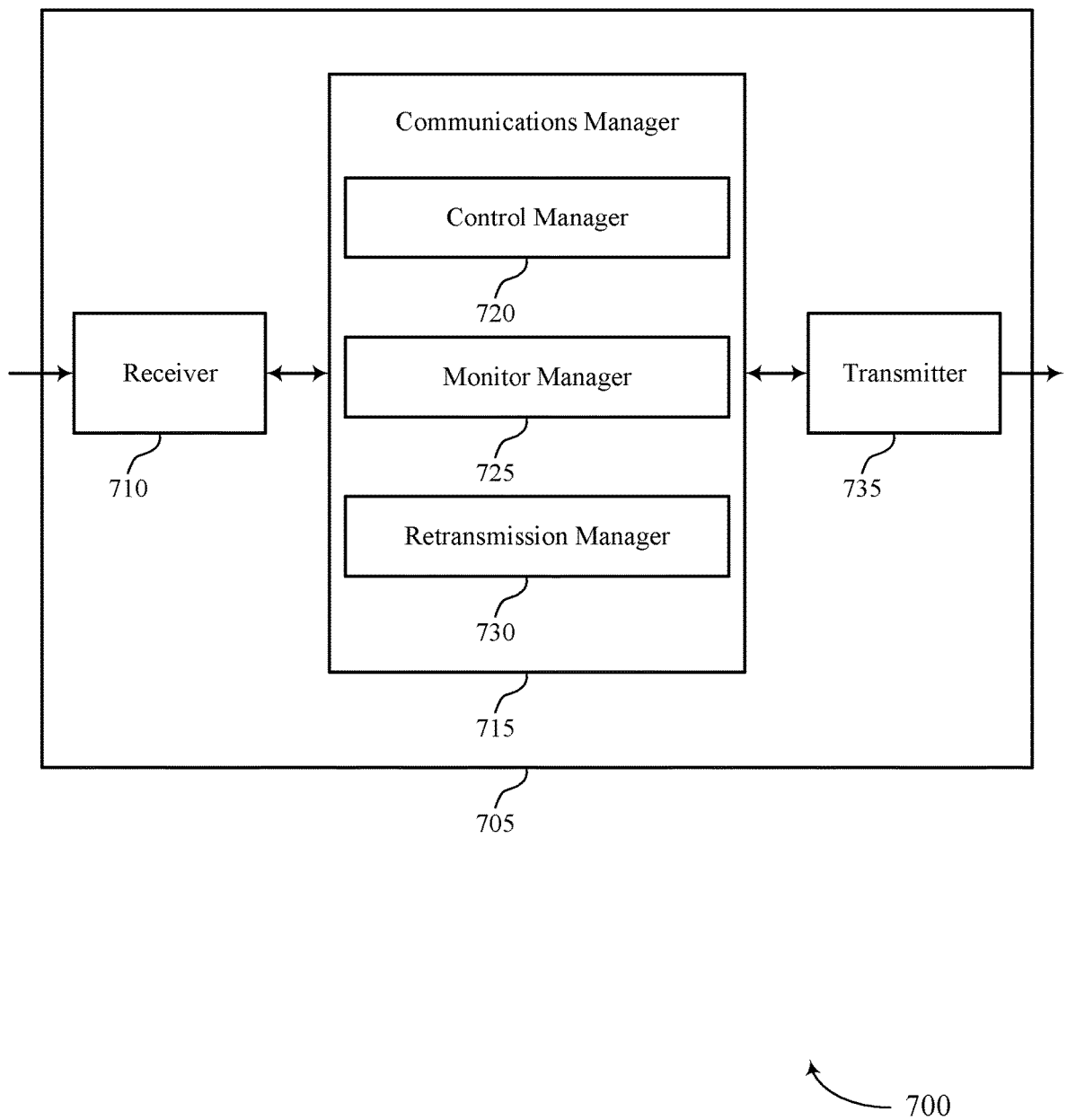

FIG. 7 shows a block diagram 700 of a device 705 that supports avoiding packet data convergence protocol holes for bearer in dual connectivity mode across multiple radio access technologies in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to avoiding packet data convergence protocol holes for bearer in dual connectivity mode across multiple radio access technologies, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a control manager 720, a monitor manager 725, and a retransmission manager 730. The communications manager 715 may be an example of aspects of the communications manager 910 described herein.

The control manager 720 may receive control signaling that configures the UE with a retransmission request time duration for requesting packet retransmission relative to when a packet in a sequence of packets is determined to be unsuccessfully received.

The monitor manager 725 may monitor for one or more transmissions including at least a subset of packets in the sequence of packets.

The retransmission manager 730 may transmit, prior to expiration of the retransmission request time duration, a first retransmission request to request retransmission of at least one packet in the sequence of packets based on a first retransmission trigger being satisfied.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
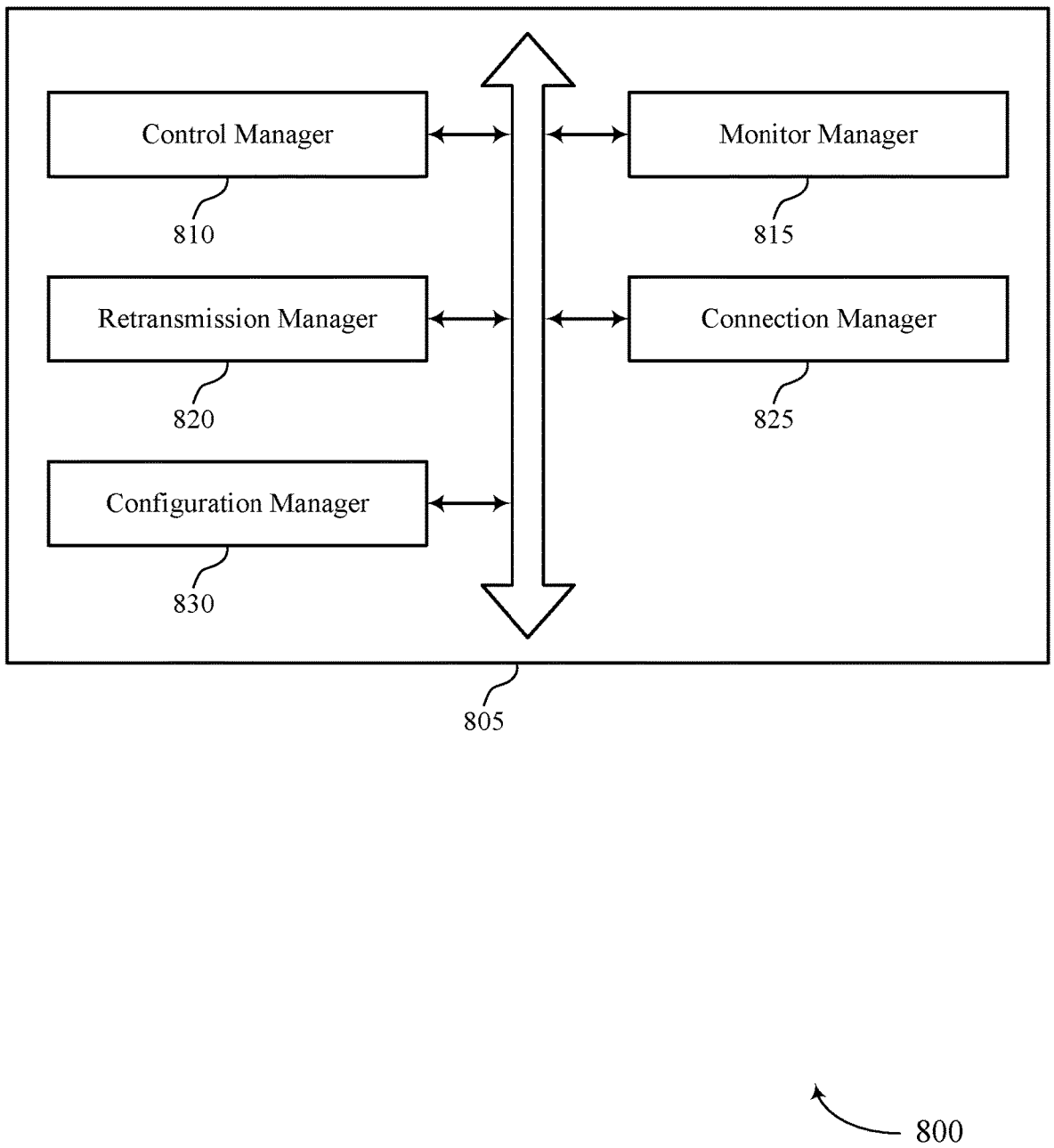
FIG. 8 shows a block diagram of a communications manager in accordance with aspects of the present disclosure.

FIG. 8 shows a block diagram 800 of a communications manager 805 that supports avoiding packet data convergence protocol holes for bearer in dual connectivity mode across multiple radio access technologies in accordance with aspects of the present disclosure. The communications manager 805 may be an example of aspects of a communications manager 615, a communications manager 715, or a communications manager 910 described herein. The communications manager 805 may include a control manager 810, a monitor manager 815, a retransmission manager 820, a connection manager 825, and a configuration manager 830. Each of these modules may communicate, directly or indirectly, with one another (e.g., via one or more buses).

The connection manager 825 may establish a first connection with a first base station via a first radio access technology and establishing a second connection with a second base station via a second radio access technology, where a first transmission of the one or more transmissions is received from the first base station and a second transmission of the one or more transmissions is received from the second base station.

The control manager 810 may receive control signaling that configures the UE with a retransmission request time duration for requesting packet retransmission relative to when a packet in a sequence of packets is determined to be unsuccessfully received.

In some examples, the control manager 810 may receive the control signaling that configures the UE with a retransmission request prohibition time duration, where the first retransmission request is transmitted prior to expiration of the retransmission request prohibition time duration.

In some examples, the control manager 810 may receive the control signaling that configures the UE with the retransmission request prohibition time duration that prohibits transmission of a next retransmission request relative to when a prior retransmission request is transmitted. In some examples, the control manager 810 may receive first control signaling from the first base station that configures the UE with a first retransmission request time duration.

In some examples, the control manager 810 may receive second control signaling from the second base station that configures the UE with a second retransmission request time duration different from the first retransmission request time duration. The monitor manager 815 may monitor for one or more transmissions including at least a subset of packets in the sequence of packets.

The retransmission manager 820 may transmit, prior to expiration of the retransmission request time duration, a first retransmission request to request retransmission of at least one packet in the sequence of packets based on a first retransmission trigger being satisfied.

In some examples, the retransmission manager 820 may transmit the first retransmission request based on the first retransmission trigger that corresponds to a first elapsed amount or first elapsed percentage of the retransmission request time duration, or a first remaining amount or first remaining percentage of the retransmission request time duration.

In some examples, the retransmission manager 820 may transmit, prior to expiration of the retransmission request time duration and after the first retransmission request, a second retransmission request based on a second retransmission trigger being satisfied.

In some examples, the retransmission manager 820 may transmit the second retransmission request based on the second retransmission trigger that corresponds to a second elapsed amount or second elapsed percentage of the retransmission request time duration, or a second remaining amount or second remaining percentage of the retransmission request time duration, where the second remaining amount or the second remaining percentage is less than a first remaining amount or a first remaining percentage corresponding to the first retransmission trigger.

In some examples, the retransmission manager 820 may transmit the first retransmission request to the first base station based on the first transmission including the at least one packet. In some examples, the retransmission manager 820 may transmit the first retransmission request to the second base station based on the second transmission including the at least one packet.

In some examples, the retransmission manager 820 may transmit the first retransmission request to the first base station based on the first transmission including the at least one packet. In some examples, the retransmission manager 820 may transmit a second retransmission request to the second base station based on the second transmission from the second base station including a second packet of the at least one packet.

In some examples, the retransmission manager 820 may transmit the first retransmission request based on the first retransmission trigger that is an amount of remaining available memory of a buffer satisfying a first memory threshold. In some examples, the retransmission manager 820 may transmit, prior to expiration of the retransmission request time duration and after the first retransmission request, a second retransmission request based on a second retransmission trigger being satisfied, where the second retransmission trigger is triggered based on an amount of remaining available memory of a buffer satisfying a second memory threshold that is less than a first memory threshold associated the first retransmission trigger.

In some cases, the first retransmission request includes a status protocol data unit that indicates the at least one packet. In some cases, the first retransmission request indicates a radio link control sequence number of a packet of the at least one packet.

The configuration manager 830 may switch from a first feedback mode to a second feedback mode based on the first retransmission trigger that is a remaining time of the retransmission request time duration satisfying a first remaining time threshold, or is an amount of remaining available memory of a buffer satisfying a first memory threshold.

In some examples, the configuration manager 830 may switch back to the first feedback mode based on the amount of remaining available memory of the buffer not satisfying the first memory threshold. In some examples, the configuration manager 830 may switch back to the second feedback mode from a third feedback mode based on the amount of remaining available memory of the buffer not satisfying the second memory threshold. In some cases, the second feedback mode configures the UE to transmit a retransmission request at a higher rate than in the first feedback mode.

Figure 9:
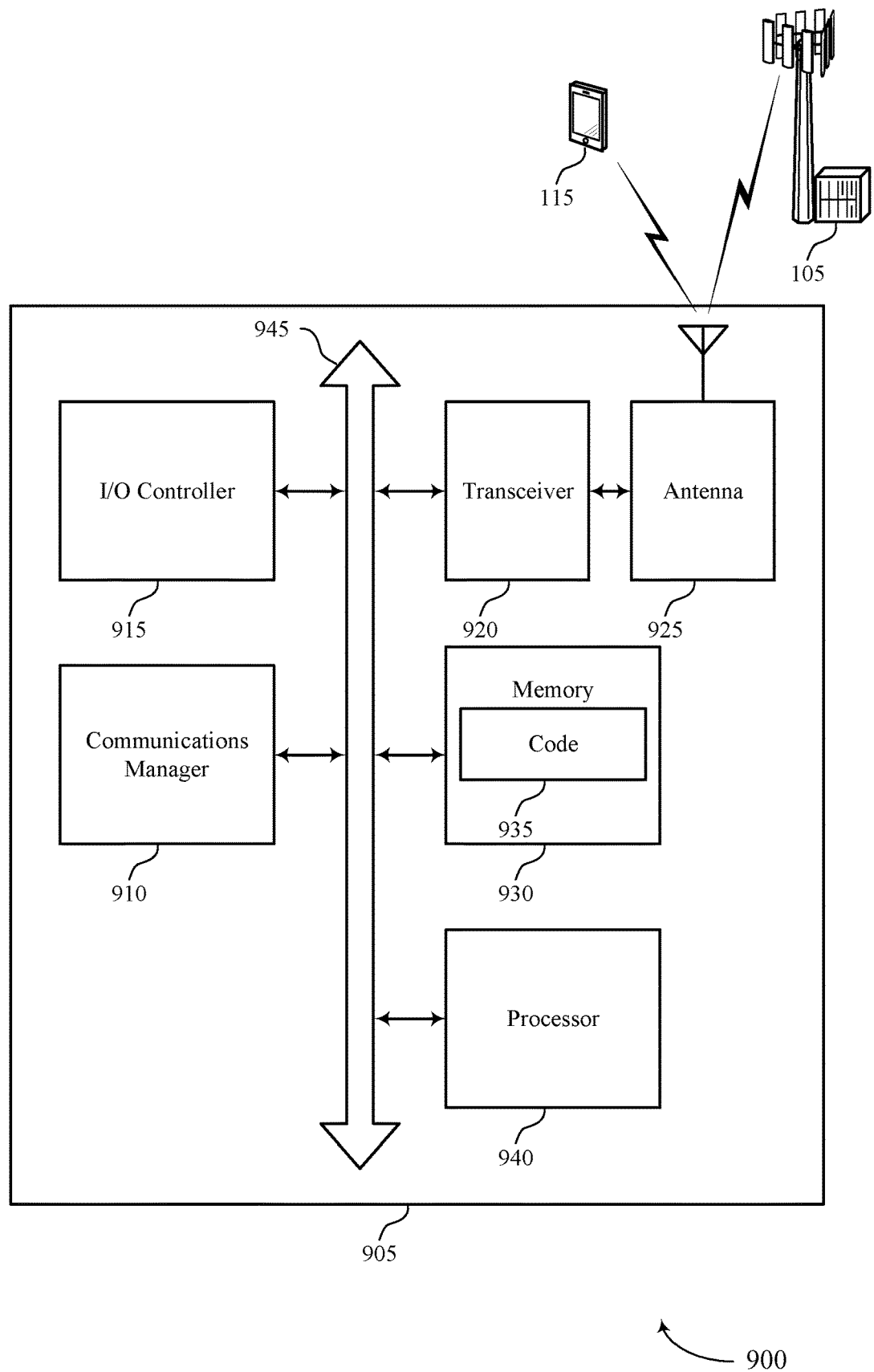
FIG. 9 shows a diagram of a system including a device in accordance with aspects of the present disclosure.

FIG. 9 shows a diagram of a system 900 including a device 905 that supports avoiding packet data convergence protocol holes for bearer in dual connectivity mode across multiple radio access technologies in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive control signaling that configures the UE with a retransmission request time duration for requesting packet retransmission relative to when a packet in a sequence of packets is determined to be unsuccessfully received, monitor for one or more transmissions including at least a subset of packets in the sequence of packets, and transmit, prior to expiration of the retransmission request time duration, a first retransmission request to request retransmission of at least one packet in the sequence of packets based on a first retransmission trigger being satisfied.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting avoiding packet data convergence protocol holes for bearer in dual connectivity mode across multiple radio access technologies).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

By including or configuring the communications manager 910 in accordance with examples as described herein, the device 905 may support techniques for reducing a time it takes to recover missing packets to avoid packet data convergence protocol holes. By avoiding packet data convergence protocol holes, the device 905 reduces packet loss, resulting in improved communication reliability, reduced latency, improved user experience related to reduced processing, reduced power consumption, more efficient utilization of communication resources, improved coordination between devices, longer battery life, and improved utilization of processing capability.

Figure 10:
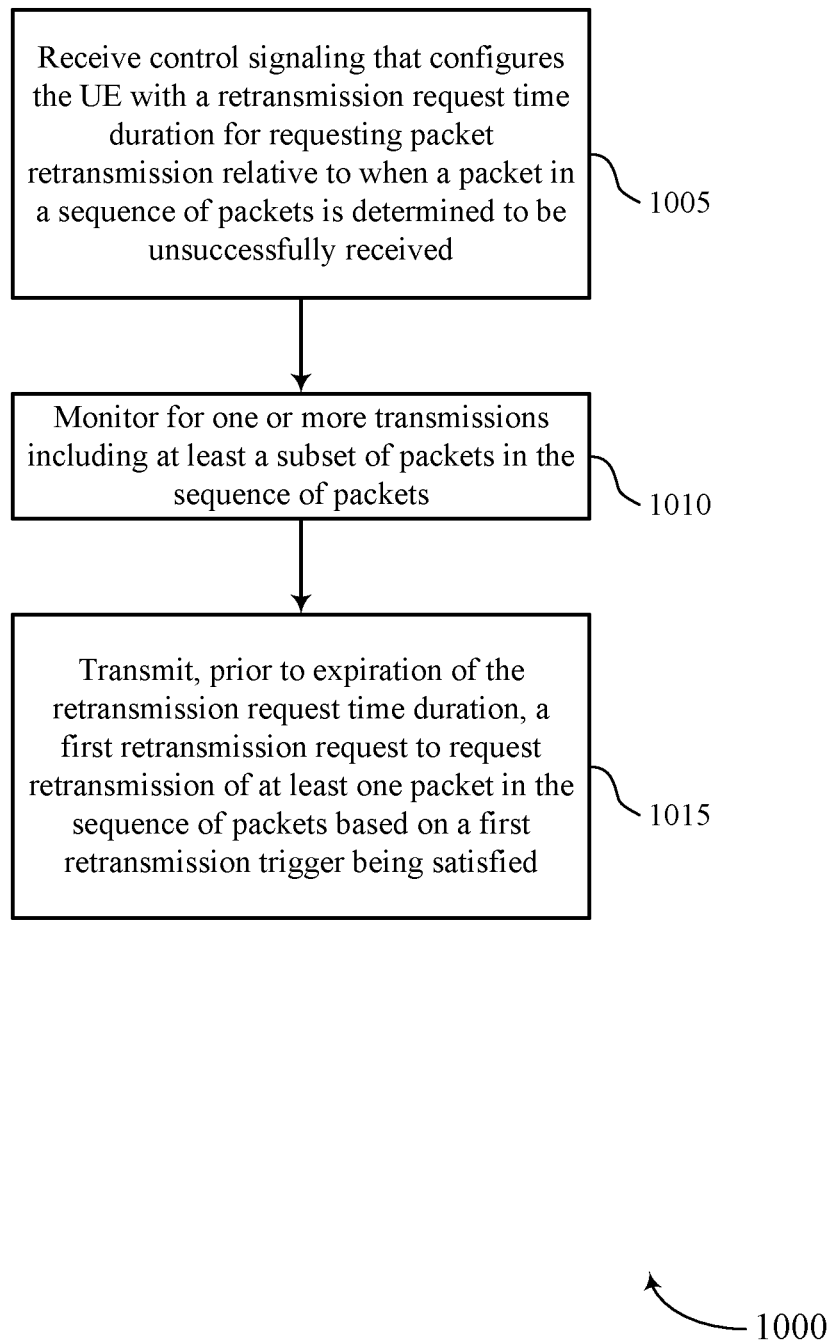
FIGS. 10 and 11 show flowcharts illustrating methods in accordance with aspects of the present disclosure.

FIG. 10 shows a flowchart illustrating a method 1000 that supports avoiding packet data convergence protocol holes for bearer in dual connectivity mode across multiple radio access technologies in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may receive control signaling that configures the UE with a retransmission request time duration for requesting packet retransmission relative to when a packet in a sequence of packets is determined to be unsuccessfully received. The operations of 1005 may be performed according to the methods described herein. In some examples, aspects of the operations of 1005 may be performed by a control manager as described with reference to FIGS. 6 through 9.

At 1010, the UE may monitor for one or more transmissions including at least a subset of packets in the sequence of packets. The operations of 1010 may be performed according to the methods described herein. In some examples, aspects of the operations of 1010 may be performed by a monitor manager as described with reference to FIGS. 6 through 9.

At 1015, the UE may transmit, prior to expiration of the retransmission request time duration, a first retransmission request to request retransmission of at least one packet in the sequence of packets based on a first retransmission trigger being satisfied. The operations of 1015 may be performed according to the methods described herein. In some examples, aspects of the operations of 1015 may be performed by a retransmission manager as described with reference to FIGS. 6 through 9.

Figure 11:
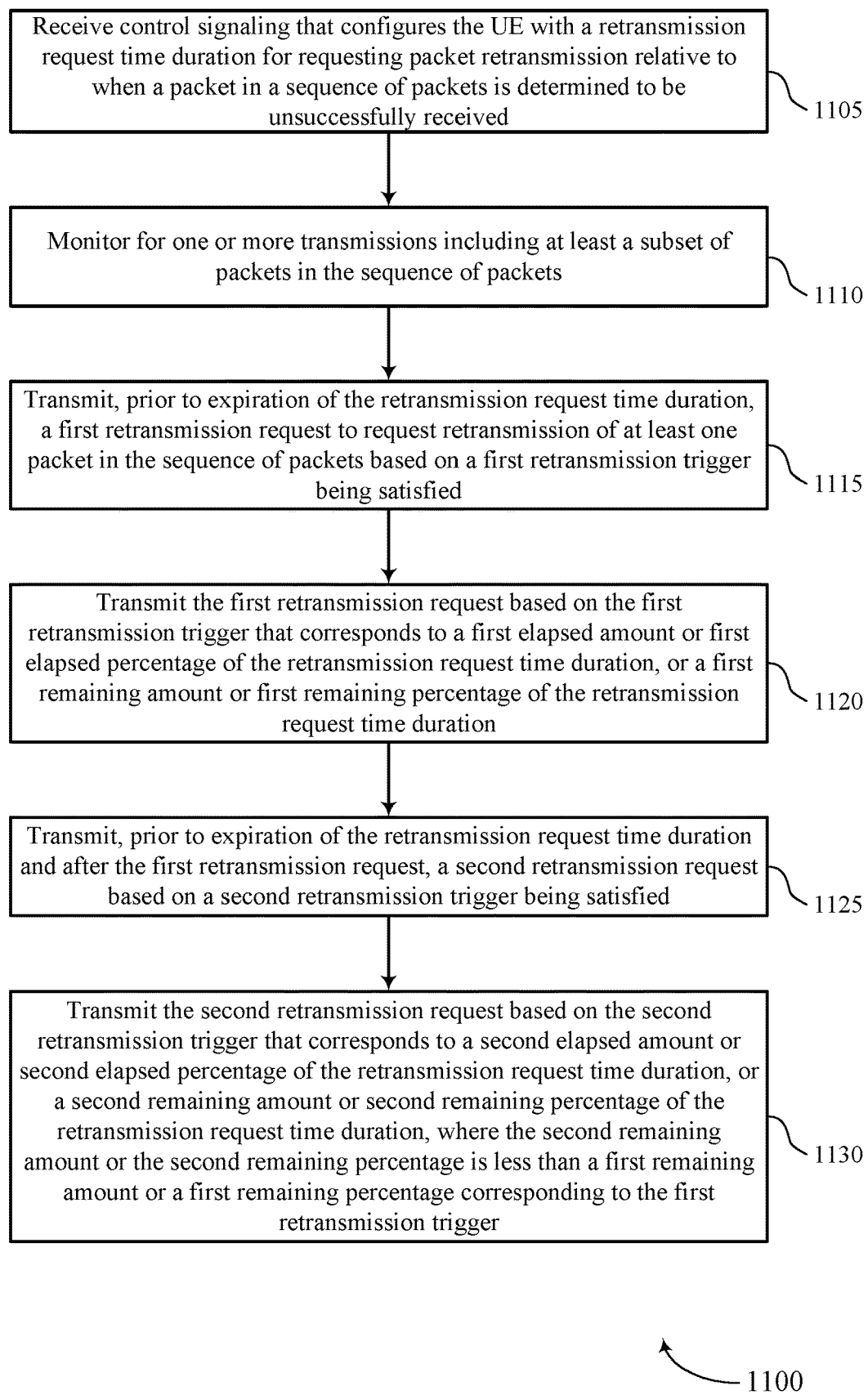

FIG. 11 shows a flowchart illustrating a method 1100 that supports avoiding packet data convergence protocol holes for bearer in dual connectivity mode across multiple radio access technologies in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may receive control signaling that configures the UE with a retransmission request time duration for requesting packet retransmission relative to when a packet in a sequence of packets is determined to be unsuccessfully received. The operations of 1105 may be performed according to the methods described herein. In some examples, aspects of the operations of 1105 may be performed by a control manager as described with reference to FIGS. 6 through 9.

At 1110, the UE may monitor for one or more transmissions including at least a subset of packets in the sequence of packets. The operations of 1110 may be performed according to the methods described herein. In some examples, aspects of the operations of 1110 may be performed by a monitor manager as described with reference to FIGS. 6 through 9.

At 1115, the UE may transmit, prior to expiration of the retransmission request time duration, a first retransmission request to request retransmission of at least one packet in the sequence of packets based on a first retransmission trigger being satisfied. The operations of 1115 may be performed according to the methods described herein. In some examples, aspects of the operations of 1115 may be performed by a retransmission manager as described with reference to FIGS. 6 through 9.

At 1120, the UE may transmit the first retransmission request based on the first retransmission trigger that corresponds to a first elapsed amount or first elapsed percentage of the retransmission request time duration, or a first remaining amount or first remaining percentage of the retransmission request time duration. The operations of 1120 may be performed according to the methods described herein. In some examples, aspects of the operations of 1120 may be performed by a retransmission manager as described with reference to FIGS. 6 through 9.

At 1125, the UE may transmit, prior to expiration of the retransmission request time duration and after the first retransmission request, a second retransmission request based on a second retransmission trigger being satisfied. The operations of 1125 may be performed according to the methods described herein. In some examples, aspects of the operations of 1125 may be performed by a retransmission manager as described with reference to FIGS. 6 through 9.

At 1130, the UE may transmit the second retransmission request based on the second retransmission trigger that corresponds to a second elapsed amount or second elapsed percentage of the retransmission request time duration, or a second remaining amount or second remaining percentage of the retransmission request time duration, where the second remaining amount or the second remaining percentage is less than a first remaining amount or a first remaining percentage corresponding to the first retransmission trigger. The operations of 1130 may be performed according to the methods described herein. In some examples, aspects of the operations of 1130 may be performed by a retransmission manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving control signaling that configures the UE with a retransmission request time duration for requesting packet retransmission relative to when a packet in a sequence of packets is determined to be unsuccessfully received; monitoring for one or more transmissions comprising at least a subset of packets in the sequence of packets; and transmitting, prior to expiration of the retransmission request time duration, a first retransmission request to request retransmission of at least one packet in the sequence of packets based at least in part on a first retransmission trigger being satisfied.

Aspect 2: The method of aspect 1, wherein transmitting the first retransmission request comprises: transmitting the first retransmission request based at least in part on the first retransmission trigger that corresponds to a first elapsed amount or first elapsed percentage of the retransmission request time duration, or a first remaining amount or first remaining percentage of the retransmission request time duration.

Aspect 3: The method of any of aspects 1 through 2, further comprising: transmitting, prior to expiration of the retransmission request time duration and after the first retransmission request, a second retransmission request based at least in part on a second retransmission trigger being satisfied.

Aspect 4: The method of aspect 3, wherein transmitting the second retransmission request comprises: transmitting the second retransmission request based at least in part on the second retransmission trigger that corresponds to a second elapsed amount or second elapsed percentage of the retransmission request time duration, or a second remaining amount or second remaining percentage of the retransmission request time duration, wherein the second remaining amount or the second remaining percentage is less than a first remaining amount or a first remaining percentage corresponding to the first retransmission trigger.

Aspect 5: The method of any of aspects 1 through 4, further comprising: establishing a first connection with a first base station via a first radio access technology and establishing a second connection with a second base station via a second radio access technology, wherein a first transmission of the one or more transmissions is received from the first base station and a second transmission of the one or more transmissions is received from the second base station.

Aspect 6: The method of aspect 5, further comprising: transmitting the first retransmission request to the first base station based at least in part on the first transmission including the at least one packet.

Aspect 7: The method of any of aspects 5 through 6, further comprising: transmitting the first retransmission request to the second base station based at least in part on the second transmission including the at least one packet.

Aspect 8: The method of any of aspects 5 through 7, further comprising: transmitting the first retransmission request to the first base station based at least in part on the first transmission including the at least one packet; and transmitting a second retransmission request to the second base station based at least in part on the second transmission from the second base station comprising a second packet of the at least one packet.

Aspect 9: The method of any of aspects 1 through 8, wherein receiving the control signaling that configures the UE with the retransmission request time duration comprises: receiving the control signaling that configures the UE with a retransmission request prohibition time duration, wherein the first retransmission request is transmitted prior to expiration of the retransmission request prohibition time duration.

Aspect 10: The method of aspect 9, wherein receiving the control signaling that configures the UE with the retransmission request time duration comprises: receiving the control signaling that configures the UE with the retransmission request prohibition time duration that prohibits transmission of a next retransmission request relative to when a prior retransmission request is transmitted.

Aspect 11: The method of any of aspects 1 through 10, wherein receiving the control signaling that configures the UE with the retransmission request time duration comprises: receiving first control signaling from a first base station that configures the UE with a first retransmission request time duration; and receiving second control signaling from a second base station that configures the UE with a second retransmission request time duration different from the first retransmission request time duration.

Aspect 12: The method of any of aspects 1 through 11, wherein transmitting the first retransmission request comprises: transmitting the first retransmission request based at least in part on the first retransmission trigger that is an amount of remaining available memory of a buffer satisfying a first memory threshold.

Aspect 13: The method of any of aspects 1 through 12, further comprising: switching from a first feedback mode to a second feedback mode based at least in part on the first retransmission trigger that is a remaining time of the retransmission request time duration satisfying a first remaining time threshold, or is an amount of remaining available memory of a buffer satisfying a first memory threshold.

Aspect 14: The method of aspect 13, further comprising: switching back to the first feedback mode based at least in part on the amount of remaining available memory of the buffer not satisfying the first memory threshold.

Aspect 15: The method of any of aspects 13 through 14, wherein the second feedback mode configures the UE to transmit a retransmission request at a higher rate than in the first feedback mode.

Aspect 16: The method of any of aspects 13 through 15, further comprising: transmitting, prior to expiration of the retransmission request time duration and after the first retransmission request, a second retransmission request based at least in part on a second retransmission trigger being satisfied, wherein the second retransmission trigger is triggered based at least in part on an amount of remaining available memory of a buffer satisfying a second memory threshold that is less than a first memory threshold associated the first retransmission trigger.

Aspect 17: The method of aspect 16, further comprising: switching back to the second feedback mode from a third feedback mode based at least in part on the amount of remaining available memory of the buffer not satisfying the second memory threshold.

Aspect 18: The method of any of aspects 1 through 17, wherein the first retransmission request comprises a status protocol data unit that indicates the at least one packet.

Aspect 19: The method of any of aspects 1 through 18, wherein the first retransmission request indicates a radio link control sequence number of a packet of the at least one packet.

Aspect 20: An apparatus for wireless communications at a UE, comprising a processor; memory coupled with the processor; and instructions stored in the memory and executable by the processor to cause the apparatus to perform a method of any of aspects 1 through 19.

Aspect 21: An apparatus for wireless communications at a UE, comprising at least one means for performing a method of any of aspects 1 through 19.

Aspect 22: A non-transitory computer-readable medium storing code for wireless communications at a UE, the code comprising instructions executable by a processor to perform a method of any of aspects 1 through 19.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving control signaling that configures the UE with a retransmission request time duration and a retransmission request prohibition time duration, the retransmission request time duration for requesting packet retransmission relative to when a packet in a sequence of packets is determined to be unsuccessfully received and the retransmission request prohibition time duration for prohibiting, when the UE is operating in accordance with a first feedback mode, transmission of a next retransmission request relative to when a prior retransmission request is transmitted;
   monitoring for one or more transmissions comprising at least a subset of packets in the sequence of packets; and
   transmitting, prior to expiration of the retransmission request time duration and prior to expiration of the retransmission request prohibition time duration, a first retransmission request to request retransmission of at least one packet in the sequence of packets based at least in part on a first retransmission trigger being satisfied and the UE operating in accordance with a second feedback mode.

2. The method of claim 1, wherein transmitting the first retransmission request comprises:
   transmitting the first retransmission request based at least in part on the first retransmission trigger that corresponds to a first elapsed amount or first elapsed percentage of the retransmission request time duration, or a first remaining amount or first remaining percentage of the retransmission request time duration.

3. The method of claim 1, further comprising:
   transmitting, prior to expiration of the retransmission request time duration and after the first retransmission request, a second retransmission request based at least in part on a second retransmission trigger being satisfied.

4. The method of claim 3, wherein transmitting the second retransmission request comprises:
   transmitting the second retransmission request based at least in part on the second retransmission trigger that corresponds to a second elapsed amount or second elapsed percentage of the retransmission request time duration, or a second remaining amount or second remaining percentage of the retransmission request time duration, wherein the second remaining amount or the second remaining percentage is less than a first remaining amount or a first remaining percentage corresponding to the first retransmission trigger.

5. The method of claim 1, further comprising:
   establishing a first connection with a first base station via a first radio access technology and establishing a second connection with a second base station via a second radio access technology, wherein a first transmission of the one or more transmissions is received from the first base station and a second transmission of the one or more transmissions is received from the second base station.

6. The method of claim 5, further comprising:
   transmitting the first retransmission request to the first base station based at least in part on the first transmission including the at least one packet.

7. The method of claim 5, further comprising:
   transmitting the first retransmission request to the second base station based at least in part on the second transmission including the at least one packet.

8. The method of claim 5, further comprising:
   transmitting the first retransmission request to the first base station based at least in part on the first transmission including the at least one packet; and
   transmitting a second retransmission request to the second base station based at least in part on the second transmission from the second base station comprising a second packet of the at least one packet.

9. The method of claim 1, wherein receiving the control signaling that configures the UE with the retransmission request time duration comprises:
   receiving first control signaling from a first base station that configures the UE with a first retransmission request time duration; and
   receiving second control signaling from a second base station that configures the UE with a second retransmission request time duration different from the first retransmission request time duration.

10. The method of claim 1, wherein transmitting the first retransmission request comprises:
    transmitting the first retransmission request based at least in part on the first retransmission trigger that is an amount of remaining available memory of a buffer satisfying a first memory threshold.

11. The method of claim 1, further comprising:
    switching from the first feedback mode to the second feedback mode based at least in part on the first retransmission trigger that is a remaining time of the retransmission request time duration satisfying a first remaining time threshold, or is an amount of remaining available memory of a buffer satisfying a first memory threshold.

12. The method of claim 11, further comprising:
switching back to the first feedback mode based at least in part on the amount of remaining available memory of the buffer not satisfying the first memory threshold.

13. The method of claim 11, wherein the second feedback mode configures the UE to transmit a retransmission request at a higher rate than in the first feedback mode.

14. The method of claim 11, further comprising:
transmitting, prior to expiration of the retransmission request time duration and after the first retransmission request, a second retransmission request based at least in part on a second retransmission trigger being satisfied, wherein the second retransmission trigger is triggered based at least in part on an amount of remaining available memory of a buffer satisfying a second memory threshold that is less than a first memory threshold associated the first retransmission trigger.

15. The method of claim 14, further comprising:
switching back to the second feedback mode from a third feedback mode based at least in part on the amount of remaining available memory of the buffer not satisfying the second memory threshold.

16. The method of claim 1, wherein the first retransmission request comprises a status protocol data unit that indicates the at least one packet.

17. The method of claim 1, wherein the first retransmission request indicates a radio link control sequence number of a packet of the at least one packet.

18. The method of claim 1, wherein the retransmission request time duration is shorter than the retransmission request prohibition time duration.

19. An apparatus for wireless communications, comprising:
a processor,
memory coupled with the processor; and
instructions stored in the memory and executable by the processor to cause the apparatus to:
receive control signaling that configures the apparatus with a retransmission request time duration and a retransmission request prohibition time duration, the retransmission request time duration for requesting packet retransmission relative to when a packet in a sequence of packets is determined to be unsuccessfully received and the retransmission request prohibition time duration for prohibiting, when the apparatus is operating in accordance with a first feedback mode, transmission of a next retransmission request relative to when a prior retransmission request is transmitted;
monitor for one or more transmissions comprising at least a subset of packets in the sequence of packets; and
transmit, prior to expiration of the retransmission request time duration and prior to expiration of the retransmission request prohibition time duration, a first retransmission request to request retransmission of at least one packet in the sequence of packets based at least in part on a first retransmission trigger being satisfied and the apparatus operating in accordance with a second feedback mode.

20. The apparatus of claim 19, further comprising a transmitter, wherein the instructions to transmit the first retransmission request are executable by the processor to cause the apparatus to:
transmit, via the transmitter, the first retransmission request based at least in part on the first retransmission trigger that corresponds to a first elapsed amount or first elapsed percentage of the retransmission request time duration, or a first remaining amount or first remaining percentage of the retransmission request time duration.

21. The apparatus of claim 19, wherein the instructions are further executable by the processor to cause the apparatus to:
transmit, prior to expiration of the retransmission request time duration and after the first retransmission request, a second retransmission request based at least in part on a second retransmission trigger being satisfied.

22. The apparatus of claim 21, wherein the instructions to transmit the second retransmission request are executable by the processor to cause the apparatus to:
transmit the second retransmission request based at least in part on the second retransmission trigger that corresponds to a second elapsed amount or second elapsed percentage of the retransmission request time duration, or a second remaining amount or second remaining percentage of the retransmission request time duration, wherein the second remaining amount or the second remaining percentage is less than a first remaining amount or a first remaining percentage corresponding to the first retransmission trigger.

23. The apparatus of claim 19, wherein the instructions are further executable by the processor to cause the apparatus to:
establish a first connection with a first base station via a first radio access technology and establishing a second connection with a second base station via a second radio access technology, wherein a first transmission of the one or more transmissions is received from the first base station and a second transmission of the one or more transmissions is received from the second base station.

24. The apparatus of claim 23, wherein the instructions are further executable by the processor to cause the apparatus to:
transmit the first retransmission request to the first base station based at least in part on the first transmission including the at least one packet.

25. The apparatus of claim 23, wherein the instructions are further executable by the processor to cause the apparatus to:
transmit the first retransmission request to the second base station based at least in part on the second transmission including the at least one packet.

26. The apparatus of claim 23, wherein the instructions are further executable by the processor to cause the apparatus to:
transmit the first retransmission request to the first base station based at least in part on the first transmission including the at least one packet; and
transmit a second retransmission request to the second base station based at least in part on the second transmission from the second base station comprising a second packet of the at least one packet.

27. An apparatus for wireless communications, comprising:
means for receiving control signaling that configures the apparatus with a retransmission request time duration and a retransmission request prohibition time duration, the retransmission request time duration for requesting packet retransmission relative to when a packet in a sequence of packets is determined to be unsuccessfully received and the retransmission request prohibition time duration for prohibiting, when the apparatus is operating in accordance with a first feedback mode, transmission of a next retransmission request relative to when a prior retransmission request is transmitted;

means for monitoring for one or more transmissions comprising at least a subset of packets in the sequence of packets; and means for transmitting, prior to expiration of the retransmission request time duration and prior to expiration of the retransmission request prohibition time duration, a first retransmission request to request retransmission of at least one packet in the sequence of packets based at least in part on a first retransmission trigger being satisfied and the apparatus operating in accordance with a second feedback mode.

28. A non-transitory computer-readable medium storing code for wireless communications at a user equipment (UE), the code comprising instructions executable by a processor to:

receive control signaling that configures the UE with a retransmission request time duration and a retransmission request prohibition time duration, the retransmission request time duration for requesting packet retransmission relative to when a packet in a sequence of packets is determined to be unsuccessfully received and the retransmission request prohibition time duration for prohibiting, when the UE is operating in accordance with a first feedback mode, transmission of a next retransmission request relative to when a prior retransmission request is transmitted;

monitor for one or more transmissions comprising at least a subset of packets in the sequence of packets; and transmit, prior to expiration of the retransmission request time duration and prior to expiration of the retransmission request prohibition time duration, a first retransmission request to request retransmission of at least one packet in the sequence of packets based at least in part on a first retransmission trigger being satisfied and the UE operating in accordance with a second feedback mode.

* * * * *